United States Patent
Ionescu et al.

(10) Patent No.: US 8,345,783 B1
(45) Date of Patent: Jan. 1, 2013

(54) PHASE TRACKING SYSTEM AND METHOD

(75) Inventors: Dumitru Mihai Ionescu, San Diego, CA (US); Haidong Zhu, San Diego, CA (US); Abu Amanullah, San Diego, CA (US)

(73) Assignee: Olympus Corporation, Hachioji-Shi, Tokyo (JP)

(*) Notice: Subject to any disclaimer, the term of this patent is extended or adjusted under 35 U.S.C. 154(b) by 0 days.

(21) Appl. No.: 13/077,968

(22) Filed: Mar. 31, 2011

Related U.S. Application Data

(63) Continuation-in-part of application No. 12/099,013, filed on Apr. 7, 2008, now Pat. No. 8,036,290.

(60) Provisional application No. 60/910,635, filed on Apr. 6, 2007, provisional application No. 60/910,639, filed on Apr. 6, 2007, provisional application No. 60/910,641, filed on Apr. 6, 2007.

(51) Int. Cl.
    *H04K 1/10* (2006.01)
    *H04L 27/28* (2006.01)

(52) U.S. Cl. ........ 375/260; 375/346; 375/347; 375/362; 375/373; 375/343; 455/500; 455/501

(58) Field of Classification Search .......... 375/260, 375/340, 341, 342, 343, 346, 347, 267, 362, 375/373; 455/500, 501
See application file for complete search history.

(56) References Cited

U.S. PATENT DOCUMENTS

| | | | |
|---|---|---|---|
| 2002/0097813 A1* | 7/2002 | Vaidyanathan | 375/326 |
| 2006/0187816 A1* | 8/2006 | Kim et al. | 370/208 |
| 2009/0180575 A1* | 7/2009 | Urvas | 375/296 |
| 2010/0086084 A1* | 4/2010 | Aratani et al. | 375/340 |
| 2010/0118990 A1* | 5/2010 | Lee et al. | 375/260 |
| 2010/0238992 A1* | 9/2010 | Yamagishi | 375/232 |
| 2011/0007694 A1* | 1/2011 | Kim et al. | 370/329 |
| 2011/0243104 A1* | 10/2011 | Swarts et al. | 370/336 |

* cited by examiner

*Primary Examiner* — Phuong Phu
(74) *Attorney, Agent, or Firm* — Sheppard Mullin Richter & Hampton LLP

(57) ABSTRACT

Phase tracking in an OFDM symbol comprises determining a sufficient statistic for CFO and SFO estimation from a differential metric between a current OFDM symbol and a previous OFDM symbol transmitted on the same frequency band. The sufficient statistics corresponding to positive pilot tones are combined with those corresponding to negative pilot tones to estimate the CFO and SFO.

18 Claims, 5 Drawing Sheets

PHASE TRACKING SYSTEM AND METHOD

CROSS-REFERENCE TO RELATED APPLICATIONS

This application is a continuation-in-part of and claims the priority of U.S. application Ser. No. 12/099,013, filed on Apr. 7, 2008, which issued as U.S. Pat. No. 8,036,290 and claimed priority to U.S. Provisional Patent Applications: No. 60/910,635, No. 60/910,639, and 60/910,641, each filed Apr. 6, 2007. The contents, each of which, are incorporated herein by reference in their entirety.

FIELD OF THE INVENTION

The present invention is directed toward systems and methods for computing a minimum variance unbiased estimator of carrier and sampling clock frequency offsets for synchronization of OFDM systems.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks, to name a few.

Such networks have proliferated airports, coffee shops, hotels, offices and other public places. Additionally, wireless networking has become commonplace in the home environment to provide convenience to the user in easily connecting multiple devices. Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel. Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM (Frequency Division Multiplexing) is another technology that enables multiple devices to transmit their signals simultaneously over a communication channel in a wired or wireless setting. The devices' respective signals travel within their designated frequency band (carrier), onto which the data (text, voice, video, or other data.) is modulated. With adequate separation in frequency band spacing, multiple devices can simultaneously communicate across the same communication channel (network or point-to-point).

Orthogonal FDM (OFDM) spread spectrum systems distribute the data over a plurality of carriers that are spaced apart at precise frequencies. The spacing is chosen so as to provide orthogonality among the carriers. Thus, a receiver's demodulator recovers the modulated data with little interference from the other carrier signals. The benefits of OFDM are high spectral efficiency, resiliency to RF interference, and lower multi-path distortion or inter symbol interference (ISI). OFDM systems can be combined with other techniques (such as time-division multiplexing) to allow sharing of the individual carriers by multiple devices as well, thus adding another dimension of multiplexing capability.

With the proliferation of the many different wireless systems, interference from, for example, other transmitters may block a desired signal. Additionally, in some cases it can be necessary to estimate carrier or sampling frequency in various communication systems. Various communication systems might also diversity to improve signal reception quality.

In various embodiments, the cumulative effect of CFO and SFO might be compensated for in order to limit or avoid the performance loss. Some implementations treat each OFDM symbol as a separate entity from the perspective of correcting the SFO. These implementations may run a pilot phase tracking algorithm that may be designed to compensate for SFO. The pilot phase trading algorithm may be run anew for every OFDM symbol throughout the entire packet.

In some embodiments, synchronization algorithms might not rely on channel estimation because channel estimators may have inherent errors. This may be especially true if the channel estimators are not too sophisticated. These errors may impair the synchronization algorithms' performance.

In some cases, differential, non-coherent detection may bypass the need for channel state information. Similarly, good carrier frequency-offset estimators might rely on some differential metric in order to not depend on the quality of a channel estimator. It was shown in P. H. Moose, "A technique for orthogonal frequency division multiplexing frequency offset correction," *IEEE Trans. Commun.*, vol. COMM-42, pp. 2908-2914, October 1994, ("Moose") that a maximum likelihood (ML) estimate of the carrier frequency offset (CFO) can be obtained from a differential metric. The Moose article is incorporated herein in its entirety by reference. One limitation of the Moose article is that it does not differentiate between CFO and sampling (clock) frequency offset (SFO); that distinction was made in M. Speth, S. A. Fechtel, G. Fock, and H. Meyr, "Optimum receiver design for wireless broadband systems using OFDM—-Part I," *IEEE Trans. Commun.*, vol. 47, pp. 1668-1677, November 1999, ("Speth Part I"), M. Speth, S. A. Fechtel, G. Fock, and H. Meyr, "Optimum receiver design for OFDM-based broad-band transmission—Part II: A case study," *IEEE Trans. Commun.*, vol. 49, pp. 571-578, April 2001, ("Speth Part II"), which do start from the ML estimate in the Moose article, but the CFO and SFO estimators proposed therein lack optimality. Specifically, they fail to make the connection between sufficient statistics and ML estimators (which are not necessarily sufficient statistics); they also fail to bridge the qualitative gap between sufficient ML estimators (when they exist) and minimum variance unbiased (MVUB) estimators; what is being lost is the opportunity to achieve the Cramer-Rao bound by construction, due to the simple fact that MVUB estimators based on complete, sufficient statistics are unique (this is the Rao- Blackwell theorem) and, thereby, achieve the Cramer-Rao bound. This qualitative refinement is not recognized, discussed or implemented in prior art. Speth Parts I and II are hereby incorporated by reference in their entirety.

Further, the derivations of estimators for CFO and SFO in the Speth Part I and II articles rely heavily on Rayleigh fading channel assumptions, which imply that the fading is flat in the frequency domain; this is apparent, to the careful reader, from Section IV.C.2 in Speth Part I and II articles from the applicability and derivation of eq. (14) in Speth Part I, and from the simulation results presented in FIG. 6 of Speth Part II, which is for a Rayleigh channel. While a Rayleigh fading model is justified in satellite communications channels (negligible excess delay due to propagation through atmosphere), the same is not the case with highly frequency-selective channels, such as terrestrial fading channels and at least some of the indoors channels that model propagation of ultrawide band signals. See J. Foerster, "Channel modeling sub-committee report final," Report IEEE P802.15-02/490r1-SG3a, IEEE P802.15 Working Group for Wireless Personal Area Networks, Feb. 7, 2003, incorporated herein by reference in its entirety. For these scenarios, different frequency offset estimation methods are required, which can cope with a channel's strong frequency selectivity during estimation of the frequency offsets.

Apart from these qualitative distinctions that ultimately do influence their performance, estimators based on differential metrics perform pilot phase tracking differentially, from one OFDM symbol to the next—rather than individually for each OFDM symbol, in isolation from other OFDM symbols; it is this differential feature that correctly and desirably avoids the estimators' dependence on channel state information. The Speth Part I and II articles are incorporated herein in their entirety by reference.

From another perspective, solutions known in the art do not leverage the SFO/CFO correction, or compensation, on a form of diversity or redundancy—primarily because wireless OFDM systems are relatively new, and diversity mechanisms that could be relevant in fading channels to CFO/SFO tracking algorithms were lacking; in particular, in OFDM systems each subcarrier (tone) experiences flat fading, which does not lend itself to diversity mechanisms via signal combining. Moreover, multipath diversity in the time domain, which could be exploited by signal combining, translates into frequency selectivity in the frequency domain, which must be exploited by coding and/or interleaving, rather than by signal combining. In addition, the more recent digital broadcasting systems based on OFDM, as well as MIMO OFDM systems, do not rely on frequency hopping, which constitutes both a form of spectrum spreading and a source of diversity in fading channels. In essence, neither did SFO/CFO schemes known in the art employ any method for exploiting diversity from frequency hopping, nor did they have clear opportunities to do so.

BRIEF SUMMARY OF THE INVENTION

Various embodiments of the systems and methods described herein may be used to compute a minimum variance unbiased estimator by receiving a first OFDM signal at a pilot tone, receiving a second OFDM signal sent in the same frequency band and determining a differential phase metric between the first OFDM signal and the second OFDM signal.

In some embodiments, the differential phase metric may be used to diversity combine synchronization statistics. For example, in some embodiments a diversity system may determine a plurality of diversity observations in a diversity system by calculating a plurality of differential phase metrics at a plurality of pilot tones. The diversity observations may be collected on the same pilot tones during a number of uncorrelated frequency hops and combine.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

In various embodiments, systems may be implemented to calculate the differential phase metric at pilot tone k between two consecutive OFDM symbols sent in the same frequency band. This translates into observing, in the frequency domain, at least two consecutive OFDM symbols or as many as the number of active spectral hop bands plus one. In some embodiments, this may be repeated for other pilot tones or all tones that are to be used in estimating the carrier and sampling clock relative frequency offsets. If more than one diversity branch is available, the system may collect diversity observations on the same pilot tones. This can be done during a number of uncorrelated diversity branches, e.g. frequency hops. If more than one diversity branches are available some systems may combine diversity observations of the (sufficient) differential synchronization statistic. Various systems can apply the unique minimum variance unbiased estimator for the carrier and sampling clock relative frequency offsets. In some embodiments a symmetric representation of the frequency domain signal, such as a conjugate symmetric component retrieved from the original observables may be applied to the unique minimum variance unbiased estimator for the carrier and sampling clock relative frequency offsets. Without resorting to a symmetric component such as a conjugate symmetric component retrieved from the original observables the systems and methods described herein may combine the above estimates, for example, by summing them. In some embodiments, a system may either correct the local oscillator(s) frequency, or form and apply a correction to the demodulated samples (post DFT) based on the estimated synchronization parameters. This can be done in parallel. Additionally, the estimation procedure may be repeated throughout the duration of the packet.

Figure 1:
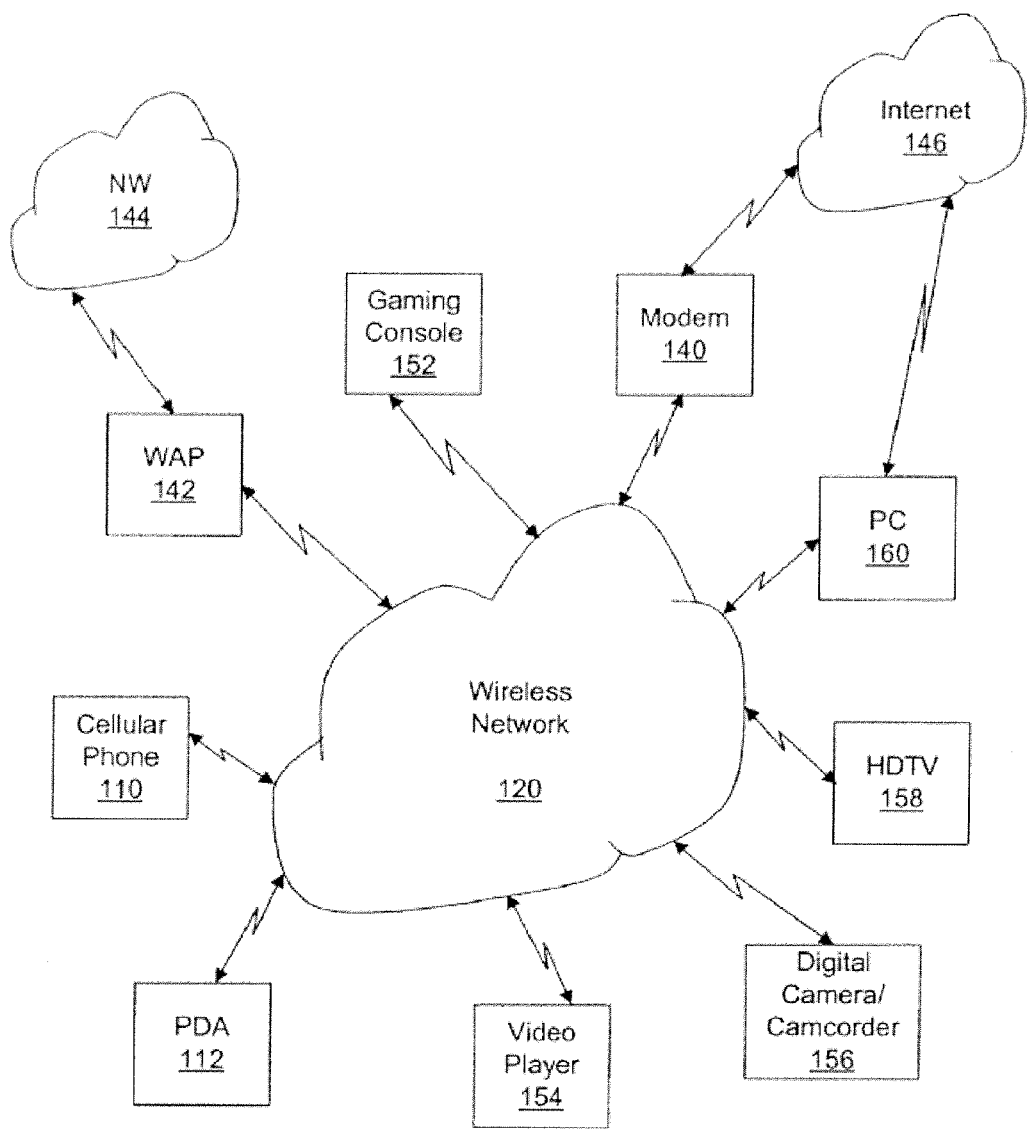
FIG. 1 is a block diagram illustrating one possible configuration of a wireless network that might serve as an example environment in which the present invention can be implemented.

Before describing the invention in detail, it is useful to describe an example environment with which the invention can be implemented. One such example is that of a wireless network. FIG. 1 is a block diagram illustrating one possible configuration of a wireless network that can serve as an example environment in which the present invention can be implemented. Referring now to FIG. 1, a wireless network 120 is provided to allow a plurality of electronic devices to communicate with one another without the need for wires or cables between the devices. A wireless network 120 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations. Another example of a wireless network is that specified by the WiMedia standard (within the WiMedia and Multi-Band OFDM Alliance). From time-to-time, the present invention is described herein in terms of wireless network. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a wireless network, nor is it limited to a WiMedia standard described as one implementation of the example environment.

With many applications, the wireless network 120 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 120 includes a communication device to allow it to communicate with external networks. More particularly, in the illustrated example, wireless network 120 includes a modem 140 to provide connectivity to an external network such as the Internet 146, and a wireless access point 142 that can provide external connectivity to another network 144.

Also illustrated in the example wireless network 120 are portable electronic devices such as a cellular telephone 110 and a personal digital assistant (PDA) 112. Like the other electronic devices illustrated in FIG. 1, cellular telephone 110 and PDA 112 can communicate with wireless network 120 via the appropriate wireless interface. Additionally, these devices may be configured to further communicate with an external network. For example, cellular telephone 110 is typically configured to communicate with a wide area wireless network by way of a base station.

Additionally, the example environment illustrated in FIG. 1 also includes examples of home entertainment devices connected to wireless network 120. In the illustrated example, electronic devices such as a gaming console 152, a video player 154, a digital camera/camcorder 156, and a high definition television 158 are illustrated as being interconnected via wireless network 120. For example, a digital camera or camcorder 156 can be utilized by a user to capture one or more still picture or motion video images. The captured images can be stored in a local memory or storage device associated with digital camera or camcorder 156 and ultimately communicated to another electronic device via wireless network 120. For example, the user may wish to provide a digital video stream to a high definition television set 158 associated with wireless network 120. As another example, the user may wish to upload one or more images from digital camera 156 to his or her personal computer 160 or to the Internet 146. This can be accomplished by wireless network 120. Of course, wireless network 120 can be utilized to provide data, content, and other information sharing on a peer-to-peer or other basis, as the provided examples serve to illustrate.

Also illustrated is a personal computer 160 or other computing device connected to wireless network 120 via a wireless air interface. As depicted in the illustrated example, personal computer 160 can also provide connectivity to an external network such as the Internet 146.

In the illustrated example, wireless network 120 is implemented to provide wireless connectivity to the various electronic devices associated therewith. Wireless network 120 allows these devices to share data, content, and other information with one another across wireless network 120. Typically, in such an environment, the electronic devices would have the appropriate transmitter, receiver, or transceiver to allow communication via the air interface with other devices associated with wireless network 120. These electronic devices may conform to one or more appropriate wireless standards and, in fact, multiple standards may be in play within a given neighborhood. Electronic devices associated with the network typically also have control logic or modules configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 120 are sometimes referred to herein as network devices, members or member devices of the network or devices associated with the network. In one embodiment, devices that communicate with a given network may be members or merely in communication with the network.

In the WiMedia physical layer standard, as in any OFDM system, it may be necessary to cope with the nonzero sampling frequency offset (SFO). In one embodiment, this can be done either by (1) estimating it (or a parameter intricately connected to it) then correcting the frequency of the local oscillator from which the sampling frequency is derived, or (2) by estimating it and simply compensating for its effect, for example, correcting the subcarrier phases and/or advancing or retracting the current sampling instant. The extent to which this estimation is inaccurate may amount to a performance loss. This can be even more so when the frequency spacing between sub-carriers is very small. In combination with the carrier frequency offset (CFO), SFO leads to performance loss can be due to a rotation of the desired modulated symbols. These symbols may be superimposed on the data tones, and forming the object of detection. Performance loss may also be due to inter-carrier interference also called frequency offset noise.

Synchronization in OFDM systems, in particular, estimating the CFO and SFO may be reduced to estimating a differential phase variation (increment) in the complex domain. Two observations in additive white Gaussian noise (AWGN) are illustration in equation (1).

$$\begin{cases} Y_1 = R_1 + v_1 \\ Y_2 = R_1 \exp(j\theta) + v_2 \end{cases} \quad (1)$$

In equation (1), all quantities except $\theta$ are complex, $j=\sqrt{-1}$, $v_1$, $v_2$ is complex (circular) AWGN with variance $\sigma_N^2$, and $\theta$ is a random phase parameter to be estimated—represents some phase increment of the signal component in the new observation $Y_2$ relative to the signal component $R_1$ in the previous observation $Y_1$. The noise terms verify $$E\{v_{1R}v_{1I}\} = E\{v_{2R}v_{2I}\} = 0 \quad (2)$$

$$\text{var}(v_1) = \text{var}(v_2) = \sigma_N^2 \quad (3)$$

$$E\{v_1\} = E\{v_2\} = 0 \quad (4)$$

$$E\{v_{1R}^2\} = E\{v_{1I}^2\} = E\{v_{2R}^2\} = E\{v_{2I}^2\} = \sigma_N^2/2 \quad (5)$$

In OFDM synchronization, the physical meaning of the above model is that the observations $Y_1$, $Y_2$ represent the complex signal in the frequency domain at a particular subcarrier. This complex signal may be taken during two consecutive OFDM symbols. Additionally, the particular subcarrier may arise as a frequency domain sample of the Fourier transform of the time domain signal, and the sampling effect is implemented via the use of the discrete Fourier transform (DFT).

It will be recognized by one of ordinary skill in the art that not only does this model admit a simple, optimal estimator for the relevant CFO/SFO parameters, but the optimal estimator, which is the unique MVUBE that achieves the Cramer-Rao bound does not rely on, or require, any information about the channel state. Accordingly, any limitations or errors of the channel estimator implemented in the receiver (for use in data detection and decoding) may be transparent to the optimality of the synchronization algorithm.

The well-known isomorphism between a complex number and a real vector in the sequel; e.g., the complex scalar $Y_1$ is isomorphic to the real element two dimensional vector $Y_1$ $$Y_1 = Y_{1R} + jY_{1I} \sim [Y_{1R} Y_{2I}]^T \triangleq Y_1. \quad (6)$$

Similarly for $Y_2$, or other vectors of complex scalars we can let the real column vector $\Xi_2 \triangleq [\Xi_{2R} \; \Xi_{2I}]^T$ represent the product $$Y^*_1 Y_2 = (Y_{1R} - jY_{1I})(Y_{2R} + jY_{2I}) \triangleq \Xi_2 \triangleq \Xi_{2R} + j\Xi_{2I} \in \mathbb{C} \quad (7)$$

via the isomorphism $\Xi_{2R} + j\Xi_{2I} \sim \Xi_2$.

The initial complex observations $Y_1, Y_2 \in \mathbb{C}$ form a 4-dimensional statistic $[Y_1^T Y_2^T]^T$. Because the complexity of the implemented estimator for $\theta$ depends on the dimensionality of the statistic being used, one may question whether there exists another statistic of smaller dimensionality that is sufficient for $\theta$. In other words, another statistic that may replace the original one $[Y_1^T Y_2^T]^T$ with no information about $\theta$ being lost. Likewise, it is worth knowing how much can the sufficient statistic's dimensionality be reduced, i.e. what is the dimension of the minimal sufficient statistic.

Various embodiments may use a statistic of reduced dimensionality. Consider, for example, the random variables transformation from $Y_1, Y_2$ to $Y_1, \Xi_2$:

$$[Y_1^T \Xi_2^T] = \begin{bmatrix} Y_1 \\ \Xi_2 \end{bmatrix}^T = [Y_1^T Y_2^T] \begin{bmatrix} I & 0 \\ 0 & W \end{bmatrix} \triangleq \hat{w}([Y_1^T Y_2^T]) \quad (8)$$

where $$W \triangleq \begin{bmatrix} Y_{1R} & -Y_{1I} \\ Y_{1I} & Y_{1R} \end{bmatrix} \quad (9)$$

Then $$[Y_1^T Y_2^T] = [Y_1^T \Xi_2^T] \begin{bmatrix} I & 0 \\ 0 & W^{-1} \end{bmatrix} \triangleq \hat{w}^{-1}([Y_1^T \Xi_2^T]) \quad (10)$$

The Jacobian of the transformation $\hat{\omega}^{-1}$ is $$J([Y_1^T \Xi_2^T]) = \det(W^{-1}) = \det^{-1}(W) = \|Y_1\|^{-2} = J_{\hat{w}^{-1}} \quad (11)$$

and the Jacobian of the transformation $\hat{\omega}(\cdot)$ is $$J_{\hat{w}} = (Y_{1R}^2 + Y_{1I}^2) = \|Y_1\|^2. \quad (12)$$

Then, by the transformation of r.v.s from $Y_1, Y_2$ to $Y_1, \Xi_2$ one finds that the probability density function (pdf) of $Y_1, Y_2$ conditioned on $\theta$ is $$f(Y_1, Y_2 \mid \theta) = f([Y_1^T \Xi_2^T] = \hat{w}([Y_1^T Y_2^T]) \mid \theta) |J_{\hat{w}}|$$

Then $$\begin{aligned} f(Y_1, Y_2 \mid \theta) &= f(Y_1, \Xi_2 \mid \theta) \|Y_1\|^2 \\ &= f(Y_1 \mid \Xi_2, \theta) f(\Xi_2 \mid \theta) \|Y_1\|^2 \\ &\stackrel{(a)}{=} f(Y_1 \mid \Xi_2) f_\theta(\Xi_2) \|Y_1\|^2 \\ &= f(Y_1 \mid W^T Y_2) \|Y_1\|^2 f_\theta(\Xi_2) \\ &\triangleq b(Y_1, Y_2) f_\theta(\Xi_2) \end{aligned} \quad (13)$$

where equality (a) follows because $Y_1$ does not depend on $\theta$, and the notation) $f(\Xi_2|\theta)=f_\theta(\Xi_2)$ is another notation for the pdf of $\Xi_2$ parameterized by the (deterministic) parameter $\theta$. $f(\Xi_2|\theta)$ is the distribution of the random parameter $\Xi_2$ parameterized by $\theta$ or conditioned on $\theta$, depending on whether $\theta$ is modeled (viewed) as deterministic or random. In the latter case, naturally, $f=(\Xi_2|\theta)=f(\Xi_2,\theta)/f(\theta)$.

By the Fisher-Neyman factorization theorem, Proposition 1: $\Xi_2$ is a 2-dimensional statistic of the observations $[Y_1^T Y_2^T]^T$ that is sufficient for the parameter $\theta$.

From this preliminary conclusion it can be shown that the ML estimator derived in the Moose article for $\theta$, based on the differential model (1), can be a function of a sufficient statistic. This will be important when the goal becomes not to find an estimate for $\theta$ per se, but rather a MVUB estimator for a vector of two parameters (CFO and SFO) that together determine the phase increment $\theta$ in OFDM synchronization problems.

A 2-dimensional complete, sufficient statistic from a 2-parameter exponential family Now write $$f(Y_1, \Xi_2 | \theta) = f(\Xi_2 | Y_1, \theta) f(Y_1 | \theta) = f(\Xi_2 | Y_1, \theta) f(Y_1) \quad (14)$$

because $Y_1$ does not depend on $\theta$.

To compute $f(\Xi_2 | Y_1, \theta)$ note that, conditioned on $Y_1$, the multiplication $Y_1^* Y_2$ is represented in vector form as $$\Xi_2^T = Y_2^T \begin{bmatrix} Y_{1R} & -Y_{1I} \\ Y_{1I} & Y_{1R} \end{bmatrix} \quad (15)$$

$$= \begin{bmatrix} R_{1R}\cos\theta - R_{1I}\sin\theta + v_{2R} \\ R_{1R}\sin\theta + R_{1I}\cos\theta + v_{2I} \end{bmatrix} \begin{bmatrix} Y_{1R} & -Y_{1I} \\ Y_{1I} & Y_{1R} \end{bmatrix}$$

$$= \begin{bmatrix} R_{1R}Y_{1R}\cos\theta - R_{1I}Y_{1R}\sin\theta + v_{2R}Y_{1R} + \\ R_{1R}Y_{1I}\sin\theta + R_{1I}Y_{1I}\cos\theta + v_{2I}Y_{1I} \\ -R_{1R}Y_{1I}\cos\theta + R_{1I}Y_{1I}\sin\theta - v_{2R}Y_{1I} + \\ R_{1R}Y_{1R}\sin\theta + R_{1I}Y_{1R}\cos\theta + v_{2I}Y_{1R} \end{bmatrix}^T$$

$$= \begin{bmatrix} \xi_{2R} + \Re(v_2 Y_1^*) \\ \xi_{2I} + \Im(v_2 Y_1^*) \end{bmatrix}^T = \begin{bmatrix} \xi_{2R} + n_{2R} \\ \xi_{2I} + n_{2I} \end{bmatrix}^T$$

where $$n_2 \triangleq v_2 Y_1^* \quad (16)$$

and, conditioned on $Y_1$, $$E\{n_2\} = 0 \quad (17)$$

$$E\{n_{2R} n_{2I}\} = E\{(v_{2R} Y_{1R} + v_{2I} Y_{1I})(v_{2I} Y_{1R} - v_{2R} Y_{1I})\} \quad (18)$$

$$= E\{v_{2R} v_{2I} Y_{1R}^2 - v_{2R}^2 Y_{1R} Y_{1I} + v_{2I}^2 Y_{1R} Y_{1I} - v_{2I} v_{2R} Y_{1I}^2\} = 0$$

$$\text{var}(n_2) = |Y_1|^2 \text{var}(v_2) \quad (19)$$

$$\text{var}(n_{2R}) = \text{var}(n_{2I}) = |Y_1|^2 \text{var}(v_2)/2 \quad (20)$$

But $$Y_1 Y_1^* = |Y_1|^2 = \quad (21)$$
$$R_1 Y_1^* + v_1 Y_1^* = (R_{1R} Y_{1R} + R_{1I} Y_{1I}) + j(R_{1I} Y_{1R} - R_{1R} Y_{1I}) + v_1 Y_1^*$$

and $$\xi_{2R} = (R_{1R} Y_{1R} + R_{1I} Y_{1I})\cos\theta + (R_{1I} Y_{1R} - R_{1R} Y_{1I})\sin\theta \quad (22)$$
$$= (|Y_1|^2 - \Re(v_1 Y_1^*))\cos\theta + \Im(v_1 Y_1^*)\sin\theta$$
$$= (|Y_1|^2 - n_{1R})\cos\theta + n_{1I}\sin\theta$$

where $$n_1 \triangleq v_1 Y_1^* \quad (23)$$

and, conditioned on $Y_1$, $$E\{n_1\} = 0 \quad (24)$$

$$E\{n_{1R} n_{1I}\} = E\{(v_{1R} Y_{1R} + v_{1I} Y_{1I})(v_{1I} Y_{1R} - v_{1R} Y_{1I})\} \quad (25)$$
$$= E\{v_{1R} v_{1I} Y_{1R}^2 - v_{1R}^2 Y_{1R} Y_{1I} + v_{1I}^2 Y_{1R} Y_{1I} - v_{1I} v_{1R} Y_{1I}^2\} = 0$$

$$\text{var}(n_1) = |Y_1|^2 \text{var}(v_1) \quad (26)$$

$$\text{var}(n_{1R}) = \text{var}(n_{1I}) = |Y_1|^2 \text{var}(v_1)/2 = \text{var}(n_{2R}) = \text{var}(n_{2I}) \quad (27)$$

$$E\{n_1 n_2^*\} = |Y_1|^2 E\{v_1 v_2^*\} = 0 \quad (28)$$

Then $$\xi_{2R} = |Y_1|^2 \cos\theta - (n_{1R}\cos\theta - n_{1I}\sin\theta) \quad (29)$$

and similarly $$\xi_{2I} = (R_{1I} Y_{1R} - R_{1R} Y_{1I})\cos\theta + (R_{1I} Y_{1I} + R_{1R} Y_{1R})\sin\theta \quad (30)$$
$$= -\Im(v_1 Y_1^*)\cos\theta + (|Y_1|^2 - \Re(v_1 Y_1^*))\sin\theta$$
$$= |Y_1|^2 \sin\theta - (n_{1I}\cos\theta + n_{1R}\sin\theta).$$

Thereby $$\Xi_2^T = [\Xi_{2R} \ \Xi_{2I}] = \begin{bmatrix} |Y_1|^2\cos\theta - n_{1R}\cos\theta + n_{1I}\sin\theta + n_{2R} \\ |Y_1|^2\sin\theta - n_{1I}\cos\theta - n_{1R}\sin\theta + n_{2I} \end{bmatrix}^T \quad (31)$$

$$= [\,|Y_1|^2\cos\theta + \upsilon_{2R} \quad |Y_1|^2\sin\theta + \upsilon_{2I}\,].$$

Also, it can be verified by straightforward calculations that $$E(\upsilon_{2R} \upsilon_{2I}) = \quad (32)$$
$$E\{(-n_{1R}\cos\theta + n_{1I}\sin\theta + n_{2R})(-n_{1I}\cos\theta - n_{1R}\sin\theta + n_{2I})\} =$$
$$E\{n_{1R} n_{1I}\cos^2\theta + n_{1R}^2\cos\theta\sin\theta - n_{1R} n_{2I}\cos\theta -$$
$$n_{1I}^2\sin\theta\cos\theta - n_{1I} n_{1R}\sin^2\theta + n_{1I} n_{2I}\sin\theta -$$
$$n_{1I} n_{2R}\cos\theta - n_{1R} n_{2R}\sin\theta + n_{2R} n_{2I}\} = 0$$

Because $\upsilon_{2R}, \upsilon_{2I}$ are uncorrelated and Gaussian, they are independent, too, conditioned on $Y_1$. Further, $$\text{var}(\upsilon_{2R}) = \text{var}(n_{1I})\sin^2\theta + \text{var}(n_{1I})\cos^2\theta + \text{var}(n_{2R}) \quad (33)$$
$$= |Y_1|^2\text{var}(v_1)/2 + |Y_1|^2\text{var}(v_2)/2 = |Y_1|^2\text{var}(v_1)$$

$$\text{var}(\upsilon_{2I}) = \text{var}(\upsilon_{2R}) = |Y_1|^2\text{var}(v_1) \quad (34)$$

$$\text{var}(\upsilon_2) = 2\,\text{var}(\upsilon_{2R}) = 2|Y_1|^2\text{var}(v_1) \quad (35)$$

Thereby, $$f(\Xi_2 | Y_1, \theta) = \frac{1}{\sqrt{2\pi}\sigma_{\upsilon_{2R}}} \exp\!\left(-\frac{(\Xi_{2R} - |Y_1|^2\cos\theta)^2}{2\sigma_{\upsilon_{2R}}^2}\right) \quad (36)$$

$$\frac{1}{\sqrt{2\pi}\sigma_{\upsilon_{2R}}} \exp\!\left(-\frac{(\Xi_{2I} - |Y_1|^2\sin\theta)^2}{2\sigma_{\upsilon_{2I}}^2}\right) =$$

$$\frac{1}{2\pi\sigma_{\upsilon_{2R}}\sigma_{\upsilon_{2I}}} \exp\!\left(-\frac{\Xi_{2R}^2 + \Xi_{2I}^2}{\sigma_{\upsilon_2}^2}\right) \exp\!\left(-\frac{|Y_1|^4\cos^2\theta + |Y_1|^4\sin^2\theta}{\sigma_{\upsilon_2}^2}\right).$$

$$\exp\!\left(\frac{2\Xi_{2R}|Y_1|^2\cos\theta + 2\Xi_{2I}|Y_1|^2\sin\theta}{\sigma_{\upsilon_2}^2}\right) = \frac{1}{\pi\sigma_{\upsilon_2}^2}\exp\!\left(-\frac{\|\Xi_2\|^2}{\sigma_{\upsilon_2}^2}\right)$$

-continued
$$\exp\left(-\frac{|Y_1|^4}{\sigma_{v_2}^2}\right)\cdot\exp\left(\frac{2\Xi_{2R}|Y_1|^2\cos\theta}{\sigma_{v_2}^2}+\frac{2\Xi_{2I}|Y_1|^2\sin\theta}{\sigma_{v_2}^2}\right)$$

Because $\|\Xi_2\|^2 = \|Y_2\|^2 \|Y_1\|^2$, $$f(\Xi_2 \mid Y_1, \theta) = \quad (37)$$
$$\frac{1}{\pi 2|Y_1|^2 \sigma_{v_1}^2} \exp\left(-\frac{\|Y_2\|^2}{2\sigma_{v_1}^2}\right) \exp\left(-\frac{\|Y_1\|^2}{2\sigma_{v_1}^2}\right) \cdot \exp\left(\frac{\Xi_{2R}\cos\theta}{\sigma_{v_1}^2}+\frac{\Xi_{2I}\sin\theta}{\sigma_{v_1}^2}\right)$$

Then, from (13) and (14)

$$f(Y_1, Y_2 \mid \theta) = f(\Xi_2 \mid Y_1, \theta) f(Y_1) \|Y_1\|^2 = \frac{1}{\pi 2|Y_1|^2 \sigma_{v_1}^2} \quad (38)$$
$$\exp\left(-\frac{\|Y_2\|^2+\|Y_1\|^2}{2\sigma_{v_1}^2}\right)\cdot\exp\left(\frac{\cos\theta\Xi_{2R}+\sin\theta\Xi_{2I}}{\sigma_{v_1}^2}\right) f(Y_1)\|Y_1\|^2 =$$
$$\frac{1}{2\pi\sigma_{v_1}^2}\exp\left(-\frac{\|Y_2\|^2+\|Y_1\|^2}{2\sigma_{v_1}^2}\right)\cdot\exp\left(\frac{\Xi_{2R}\cos\theta+\Xi_{2I}\sin\theta}{\sigma_{v_1}^2}\right) f(Y_1).$$

Denoting by x the initial 4-dimensional statistic x ≜ $[Y_1^T Y_2^T]^T$, $f_\theta([Y_1^T Y_2^T]^T)$ has the form $c(\theta)a(x)\exp(\{\sum_{i=1}^{2}\pi_i(\theta)t_i(x)\})$ with $\pi_1(\theta)=\cos\theta$, $\pi_2(\theta)=\sin\theta$, $t_1(x)=\Xi_{2R}$, $t_2(x)=\Xi_{2I}$; $f(Y_1,Y_2|\theta)$ belongs thereby to a 2-parameter exponential family and $t(x)=[t_1(x) t_2(x)]^T=[\Xi_{2R} \Xi_{2I}]^T$ is a 2-dimensional sufficient statistic for θ that is also complete, and thereby minimal, by virtue of the properties of exponential distribution families. This, along with (32), (31) is summarized in Proposition 2: $\Xi_2$, the 2-dimensional statistic of the observations $[Y_1^T Y_2^T]^T$, is a complete, and thereby minimal, sufficient statistic for the parameter θ of (1); the two components of the sufficient statistic are affected by independent additive Gaussian noise terms.

Various embodiments can use an alternative expression for the minimal sufficient statistic. For example, an alternative perspective on the expression of the sufficient statistic $[\Xi_{2R} \Xi_{2I}]^T$ is obtained via $$\Xi_{2R} + j\Xi_{2I} = Y_2 Y_1^* = (R_1 \exp(j\theta) + v_2)(R_1^* + v_1^*) \quad (39)$$
$$= |R_1|^2 \exp(j\theta) + v_2 R_1^* + R_1 \exp(j\theta)v_1^* + v_2 v_1^*$$
$$= |R_1|^2\cos\theta + j|R_1|^2\sin\theta + v_{2R}R_{1R} + v_{2I}R_{1I} +$$
$$j(-v_{2R}R_{1I}+v_{2I}R_{1R}) + [(R_{1R}\cos\theta - R_{1I}\sin\theta) +$$
$$j(R_{1R}\sin\theta + R_{1I}\cos\theta)](v_{1R} - jv_{1I}) +$$
$$(v_{2R} - jv_{2I})(v_{1R} - jv_{1I})$$
$$= |R_1|^2\cos\theta + j|R_1|^2\sin\theta + v_{2R}R_{1R} + v_{2I}R_{1I} +$$
$$j(-v_{2R}R_{1I}+v_{2I}R_{1R}) + [(R_{1R}\cos\theta - R_{1I}\sin\theta)v_{1R} +$$
$$(R_{1R}\sin\theta + R_{1I}\cos\theta)v_{1I}] + j[(R_{1R}\sin\theta + R_{1I}\cos\theta)v_{1R} -$$
$$(R_{1R}\cos\theta - R_{1I}\sin\theta)v_{1I}] + (v_{2R}v_{1R} + v_{2I}v_{1I}) +$$
$$j(v_{2I}v_{1R} - v_{2R}v_{1I})$$

$$\Xi_{2R} = |R_1|^2\cos\theta + v_{2R}R_{1R} + v_{2I}R_{1I} + \quad (40)$$
$$[(R_{1R}\cos\theta - R_{1I}\sin\theta)v_{1R} + (R_{1R}\sin\theta + R_{1I}\cos\theta)v_{1I}] +$$
$$\underbrace{(v_{2R}v_{1R} + v_{2I}v_{1I})}_{\mu''_{2R}}$$
$$= |R_1|^2\cos\theta + \mu'_{2R} + \mu''_{2R} \triangleq |R_1|^2\cos\theta + \mu_{2R}$$

-continued
$$\Xi_{2I} = |R_1|^2\sin\theta + (-v_{2R}R_{1I} + v_{2I}R_{1R}) + \quad (41)$$
$$[(R_{1R}\sin\theta + R_{1I}\cos\theta)v_{1R} - (R_{1R}\cos\theta - R_{1I}\sin\theta)v_{1I}] +$$
$$\underbrace{(v_{2I}v_{1R} - v_{2R}v_{1I})}_{\mu''_{2I}}$$
$$= |R_1|^2\sin\theta + \mu'_{2I} + \mu''_{2I}$$

The correlation between $\mu_{2R}$ and $\mu_{2I}$ may be determined as:

$$E\{\mu_{2R}\mu_{2I}\}=E\{(\mu'_{2R}+\mu''_{2R})(\mu'_{2I}+\mu''_{2I})\}=E\{\mu'_{2R}\mu'_{2I}\}+$$
$$E\{\mu'_{2R}\mu''_{2I}\}+E\{\mu''_{2R}\mu'_{2I}\}+E\{\mu''_{2R}\mu''_{2I}\} \quad (42)$$

It can be verified by straightforward calculations, albeit cumbersome and lengthy, that each of the terms in (42) vanish and $$E\{\mu_{2R}\mu_{2I}\}=0 \quad (43)$$

Therefore, the additive noise terms in the two components of the sufficient statistic for θ are uncorrelated. However, neither $\mu_{2R}$ nor $\mu_{2I}$ are strictly speaking Gaussian, and without normality (43) does not imply independence of $\mu_{2R}$ from $\mu_{2I}$. Nonetheless, the expressions involving $\Xi_{2R}$ and $\Xi_{2I}$ in the actual estimator(s) will enable the use of the central limit theorem, and will thereby be seen to allow one to separate the averaging operations over expressions containing $\mu_{2R}$ and respectively $\mu_{2I}$.

One embodiment may include an application to CFO and SFO estimation. The sufficient statistic $[\Xi_{2R} \Xi_{2I}]^T$ may be used directly to obtain a ML estimate of the phase parameter θ as in the Moose article, via $\hat{\theta} \triangleq \arctan(\Xi_{2I}/\Xi_{2R})$, where $\hat{\cdot}$ denotes an estimate.

This ML estimate may have several drawbacks. In some embodiments, it may only estimate the differential phase θ. Additionally, it might not readily distinguish between components of θ that depend on other meaningful parameters, such as the carrier and sampling clock frequency offsets relevant to OFDM synchronization. In addition, maximization of the likelihood probability may not minimize the estimator's variance, nor may it guarantee the estimator's performance near the Cramer-Rao bound; among ML estimators some perform better than others in term of estimation error variance. Besides, this estimator is generally not unbiased, as can be seen from Jensen's inequality, and the fact that the tangent function is not linear; depending on the size of arg $(\Xi_{2R}+j\Xi_{2I})$ the expectation of the estimate, $E\{\hat{\theta}\}$, may deviate substantially from θ.

The OFDM synchronization problem seeks to prevent degradation of the SNR seen by the outer receiver due to carrier frequency offset (CFO) and the sampling clock frequency offset (SFO); in OFDM timing and synchronization issues are corrected both before and after DFT. The synchronization problem relevant herein deals with observations in the frequency domain, i.e. post DFT. Specifically of interest will be the post DFT fractional carrier frequency offset and the relative sampling clock frequency offset.

It can be shown that the demodulated signal in the frequency domain, during the l-th OFDM symbol and at the k-th subcarrier, post DFT, and with the appropriate CFO and SFO parameters incorporated in the model, is $$z_{l,k}=\exp(j\pi\phi_k)\exp[j2\pi((lN_s + N_g)/N)\phi_k]\alpha(\phi_k)a_{l,k}H_k+n_{\Omega;\ l,k}+n_{l,k} \quad (44)$$

where $N_s \triangleq N+N_g$, N represents the size of the DFT transform, $N_g$ is the number of samples contained in the cyclic prefix (or zero padding interval), $N_s$ represents the number of samples in the extended OFDM symbol, $a_{l,k}$ is the complex symbol on the k-th subcarrier of the l-th OFDM symbol, $H_k$ is the frequency domain channel coefficient associated with the k-th subcarrier, which is distributed as a circularly symmetric Gaussian random variable.

The AWGN noise term $n_{l,k}$ models in the frequency domain the AWGN in the time domain; $n_{\Omega;\,l,k}$ is the ICI, or frequency offset noise. The factor $\alpha(\phi_k)$ is a notation for a ratio of sine functions, $\sin(\pi\phi_k)/\sin(\pi\phi_k/N)$, which has value N when $\phi_k=0$, and can be approximated by N when $\phi_k$ is very small. When the synchronization actually controls the local oscillators that supply the sampling clock and carrier frequencies, the approximation $\alpha(\phi_k)\approx N$ is very good, and the fact that the phase error $\phi_k\neq 0$ is not quite 0 is practically inconsequential. However, in the case when the Fourier transform size is large, and attempts are not made to control the local oscillators' frequencies—but, rather, the receiver algorithms attempt to simply estimate these offsets and compensate for them—the phase error $\phi_k$ can be large enough, for large k, to cause $\alpha(\phi_k)$ to depart from its desired maximum, N, at the origin. In these cases the CFO and SFO can lead to significant SNR loss.

The differential phase increment can be modeled by the phase $\phi_k$ which is given by:

$$\phi_k = \Delta f T_u + \xi k \quad (45)$$

where $\Delta f$ is the carrier frequency offset, $T_u$ is the duration of the proper OFDM symbol (cyclic prefix excluded, i.e. $T_u^{-1}$ is the subcarrier spacing), and $\Delta f T_u$ is the carrier frequency offset normalized to the subcarrier spacing. $\xi \triangleq (T'-T)/T = (1/T - 1/T')/1/T'$ is the sampling frequency offset normalized to the receiver's sampling clock frequency. The normalized CFO $\Delta f T_u$ is $\Delta f' \triangleq \Delta f T_u = n_I + \Delta f'_F$, with $\Delta f'_F < 1$. The integer normalized CFO is manifested in a shift of the frequency domain DFT samples, and is corrected separately from the fractional normalized carrier frequency offset $\Delta f'_F$.

In the sequel denote $$n_{\Omega;\,l,k} + n_{l,k} \triangleq v_{l,k} \quad (46)$$

The factor $\exp(j\pi\phi_k)$ cannot be distinguished from the channel gain $H_k$, and may thus be (viewed as) incorporated in $H_k$.

The approximations discussed above are largely irrelevant to the problem of estimating the carrier and sampling frequency offsets—because the sufficient statistic is based on a differential metric that only needs to model the phase increment induced by imperfect synchronization from one OFDM symbol to the next. This means that synchronization may remain transparent to knowledge of CSI (via $H_k$). Additionally, because relying on channel estimates would impair synchronization due to inherent channel estimation errors it may be advantageous to synchronize without using such estimator.

The following analysis assumes that either the integer normalized CFO has been corrected post DFT and only the fractional normalized carrier frequency offset $\Delta f'_F$ remains to be corrected or that the initial CFO $\Delta f$ is less than the subcarrier spacing $T_u^{-1}$. The latter can be the case, for example, when the Fourier transform size N is small. When the Fourier transform size is small, the intercarrier spacing is larger than twice the tolerance of the frequency reference used by the receiver's local oscillator. Accordingly, the handling of the two components can be separated from each other.

Consider the problem formulated in terms of the above set-up as $$z_{l-1,k} = R_{l-1,k} + v_{l-1,k} \quad (47)$$

$$z_{l,k} = R_{l-1,k} \exp(j\Delta\varphi_{k,(1)}) + v_{l,k}$$

where $\Delta\phi_{k,(1)}$ is the variation of the k-th subcarrier's phase due to nonzero CFO and SFO, according to (44), (45), over the duration of one OFDM symbol, i.e. from one OFDM symbol to the next; also, $$|R_{l-1,k}|^2 = \alpha^2(\phi_k)|a_{l,k}|^2|H_k|^2; \quad (48)$$

if the synchronization limits itself to subcarriers that carry pilot symbols of energy $\beta^2\sigma_a^2$, with $\sigma_a^2$ the energy of the complex constellation used for pilots and $\beta^2 > 1$ the energy-boost factor for the pilot symbols, then $$|R_{l-1,k}|^2 = \alpha^2 = \alpha^2(\phi_k)\beta^2\sigma_a^2|H_k|^2 \quad (49)$$

This is the same model as the one in (1), used to derive the sufficient statistic; according to above results, a sufficient, complete and minimal statistic for $\Delta\phi_{k,(1)}$ is $$x_{l,k} \triangleq z_{l,k}z^*_{l-1,k}. \quad (50)$$

The only assumption made is the benign assumption that the channel does not change for the duration necessary to compute the differential metric. Let C be the set of indices of the subcarriers that are to be used for CFO and SFO estimation; typically these symbols are pilot symbols, sometimes implemented as continuous or scattered pilots. C is assumed to be symmetric around 0, i.e. if $k \in C$ then $-k \in C$; it is useful to denote the subset of positive indices in C as $C_+$.

Considering, as discussed above, only the fractional (normalized) carrier frequency offset $\Delta f_F T_u$, the phase variation on subcarriers $-k$ and $k$, according to (44), (45), over the duration of one OFDM symbol, i.e. from one OFDM symbol to the next (index l incremented only by 1), is $$\Delta\varphi_{\pm k,(1)} = 2\pi((N+N_g)/N)\phi_k = 2\pi((N+N_g)/N)(\Delta f_F T_u \pm \zeta k) = \quad (51)$$
$$2\pi((N+N_g)/N)\Delta f_F T_u + 2\pi((N+N_g)/N)\zeta k \triangleq \Delta f''_F \pm \zeta' k.$$

Similarly, the phase variation on subcarriers $-k$ and k, according to (44), (45), over the duration of $\gamma$ consecutive OFDM symbols is $$\Delta\varphi_{\pm k,(\gamma)} = 2\pi\gamma((N+N_g)/N)\phi_k = \quad (52)$$
$$2\pi\gamma((N+N_g)/N)(\Delta f_F T_u \pm \zeta k) = \gamma\Delta f''_F \pm \gamma\zeta' k.$$

Considering the result in discussed above, $\Re x_{l,k}$, $\Im x_{l,k}$, $\Re x_{l,-k}$, $\Im x_{l,-k}$ form a complete, minimal, sufficient statistic for the parameter vector $$a_k \triangleq [\Delta\phi_{k,(1)}\Delta\phi_{-k,(1)}]^T, k>0 \quad (53)$$

In one embodiment conjugate-symmetry reduction of frequency domain observations may be used. It will be useful in some cases to retrieve either the conjugate symmetric or the conjugate anti-symmetric component of the DFT sequences $z_{l-1,k}$ and $z_{l,k}$ which in general do not exhibit conjugate symmetry. The former is accomplished by the simple operation $$z_{CS;l-1,k} \triangleq \frac{1}{2}(z_{l-1,k} + z^*_{l-1,-k}) \quad (54)$$
$$= \frac{1}{2}(R_{l-1,k} + R^*_{l-1,-k}) + \frac{1}{2}(v_{l-1,k} + v^*_{l-1,-k})$$
$$= R_{CS;l-1,k} + v_{CS;l-1,k}$$

where $z_{CS;\,l-1,k}$, $R_{CS;\,l-1,k}$, and $v_{CS;\,l-1,k}$ are the conjugate symmetric components of the sequences $$\{z_{CS;l-1,k}\}_{k=0}^{N-1},$$

etc. Similarly, using (51), $$\begin{aligned}
z_{CS;l,k} &\triangleq \frac{1}{2}(z_{l,k} + z_{l,-k}^*) \\
&= \frac{1}{2}(R_{l-1,k}\exp(j\Delta\varphi_{k,(1)}) + R_{l-1,-k}^*\exp(-j\Delta\varphi_{-k,(1)})) + \frac{1}{2}(v_{l,k} + v_{l,-k}^*) \\
&= \frac{1}{2}(R_{l-1,k}\exp(j\Delta f_F'')\exp(j\zeta'k) + R_{l-1,-k}^*\exp(-j\Delta f_F'') \\
&\quad \exp(-j(-\zeta'k))) + v_{CS;l,k} \\
&= \frac{1}{2}(R_{l-1,k}\exp(j\Delta f_F'') + R_{l-1,-k}^*\exp(-j\Delta f_F''))\exp(j\zeta'k) + v_{CS;l,k} \\
&= \frac{1}{2}(R_{l-1,k} + R_{l-1,-k}^*\exp(-j2\Delta f_F''))\exp(j\Delta f_F'')\exp(j\zeta'k) + v_{CS;l,k} \\
&= \frac{1}{2}(R_{l-1,k} + R_{l-1,-k}^*\exp(-j2\Delta f_F''))\exp(j\Delta\varphi_{k,(1)}) + v_{CS;l,k} \\
&\approx \frac{1}{2}(R_{l-1,k} + R_{l-1,-k}^*)\exp(j\Delta\varphi_{k,(1)}) + v_{CS;l,k} \\
&= R_{CS;l-1,k}\exp(j\Delta\varphi_{k,(1)}) + v_{CS;l,k}
\end{aligned} \quad (55)$$

where the approximation $R_{l-1,-k}^*\exp(-j2\Delta f_F'')\approx R_{l-1,-k}^*$ is justified whenever the fractional (or even total) CFO $\Delta f_F$ is much smaller than the phases of at least one of the factors of $R_{l-1,-k}^*$. This is de facto the case in all practical implementations; e.g., $R_{l-1,k}=\alpha(\phi_k)a_{l,k}H_k$, where $a_{l,k}$ is a complex symbol, be it pilot or data, from a (possibly finite size) constellation, such as M-QAM; e.g., in the case of 4-QAM, the phase of $a_{l,k}$ is a multiple of $\pi/4 >> \Delta f''_F$ where $\Delta f''_F = 2\pi((N+N_g)/N)\Delta f_F T_u = 2\pi((N+N_g)/N)\Delta f_F$ and $\Delta f_F$ is no larger than 100 ppm (parts per million).

Equations (54), (55) have the same form as (47), and thereby the results apply to $z_{CS;\,l-1,k}$, $z_{CS;\,l,k}$ as they did to $z_{l-1,k}$, $z_{l,k}$, with the distinction that $z_{CS;\,l-1,k}$, $z_{CS;\,l,k}$ have conjugate symmetry and verify $|z_{CS;\,l,k}|=|z_{CS;\,l,-k}|$; note that this operation reduces the noise variance, i.e. $v_{CS;\,l,k}$ has half the variance of $v_{l,k}$.

When the conjugate symmetry is necessary, $z_{CS;\,l-1,k}$, $z_{CS;\,l,k}$ can be used in place of $z_{l-1,k}$, $z_{l,k}$. A similar discussion applies to using the conjugate anti-symmetry component of $z_{l-1,k}$, $z_{l,k}$.

In systems like the ultrawide band (UWB) multiband OFDM frequency hopping is allowed as a form of spectrum spreading, which opens up the possibility of using diversity techniques in synchronization algorithms.

Eqs. (40), (41), (43) can be invoked to justify a diversity method that combines the observations $x_{l,k}$ among all frequency bands used in spectrum hopping during $\gamma$ consecutive OFDM symbols. In an OFDM system phase variation on subcarrier k must be monitor according to (44) and (45), over the duration of $\gamma$ consecutive OFDM symbols, $\gamma>1$. Let $$\chi_{l,k;\gamma} \triangleq \sum_{i=1}^{\gamma} x_{l,k|i} \quad (56)$$

where $x_{l,k|i}$ is the sufficient statistic obtained while hopping in the i-th hopped band, i=1, ..., $\gamma$. With an obvious notation, what is being combined are the magnitudes $|R_{l-1,k|i}|$, per eq. (49). Combining these observations does not change the dimensionality of a sufficient statistic derived from a $\kappa$-parameter exponential family. The new statistic is sufficient and complete for $\Delta\phi_{k,(\gamma)}$ of (52), and $$\Re\, x_{l,k;\gamma} = \cos(\Delta\varphi_{k,(\gamma)})\sum_{i=1}^{\gamma} |R_{l-1,k|i}|^2 + \mu_{l,k;\gamma;R} \quad (57)$$

$$\Im\, x_{l,k;\gamma} = \sin(\Delta\varphi_{k,(\gamma)})\sum_{i=1}^{\gamma} |R_{l-1,k|i}|^2 + \mu_{l,k;\gamma;I} \quad (58)$$

or, using (49), $$\Re\, x_{l,k;\gamma} = \alpha^2(\phi_k)\beta^2\sigma_a^2\left(\sum_{i=1}^{\gamma} |H_{k|i}|^2\right)\cos(\Delta\varphi_{k,(\gamma)}) + \mu_{l,k;\gamma;R}, \quad (59)$$

$$\Im\, x_{l,k;\gamma} = \alpha^2(\phi_k)\beta^2\sigma_a^2\left(\sum_{i=1}^{\gamma} |H_{k|i}|^2\right)\sin(\Delta\varphi_{k,(\gamma)}) + \mu_{l,k;\gamma;I}, \quad (60)$$

and the diversity combined statistic $[\Re\,\chi_{l,k;\gamma}\,\Im\,\chi_{l,k;\gamma}]^T$ is a two-dimensional sufficient statistic for $\Delta\phi_{k,(\gamma)}=\gamma\Delta f''_F\pm\gamma\zeta'k$, see (52), which is also complete and minimal per reasoning detailed above.

Any estimators based on $x_{l,k}$ can be used on the diversity combined statistic $[\Re\,\chi_{l,k;\gamma}\,\Im\,\chi_{l,k;\gamma}]^T$, with the advantage given by diversity. Note that the diversity-combining-induced-summation of the noise terms in the observations $x_{l,k}$ do enable the applicability of the central limit theorem to infer that the sufficient statistic is Gaussian. The applicability of the CLT is mirrored in the use of an unbiased estimator for both $\zeta$ and $\Delta f_F T_u$, which serves as the starting point in the derivation of their, respectively unique, MVUBEs; the applicability of the CLT is due to a similar addition of noise terms inherent in the form of the unbiased estimators that lead to the MVUBEs.

In effect, the diversity combined statistic $[\Re\,\chi_{l,k;\gamma}\,\Im\,\chi_{l,k;\gamma}]^T$ lends itself very well to computing MVUBEs for both $\zeta$ and $\Delta f_F T_u$. In some embodiments, the expectation operation averages out additive noise.

In some embodiments, an MVUB estimator for CFO and SFO can be used. Consider the scalar function of $a_k$, $$b(a_k) \triangleq \tan[\tfrac{1}{2}(\Delta\phi_{k,(1)}-\Delta\phi_{-k,(1)})]=\tan(\zeta''k). \quad (61)$$

Consider the estimate $$\widehat{b(a_k)} \triangleq \frac{\Im\,x_{l,k} - \Im\,x_{l,-k}}{\Re\,x_{l,k} + \Re\,x_{l,-k}}. \quad (62)$$

By (32), averaging the ratio of differences between homologous components of the sufficient statistics for subcarriers k, –k, can be done by averaging the numerator and denominator separately; via (31), and whenever the magnitude of the Fourier transform is the same at symmetric (around zero) frequencies, i.e. $|z_{l,k}|=|z_{l,-k}|$, $$E\{\widehat{b(a_k)}\} = \frac{|z_{l,k}|^2\sin(\Delta f_F'' + \zeta'k) - |z_{l,-k}|^2\sin(\Delta f_F'' - \zeta'k)}{|z_{l,k}|^2\cos(\Delta f_F'' + \zeta'k) + |z_{l,-k}|^2\cos(\Delta f_F'' - \zeta'k)} = \tan(\zeta'k) \quad (63)$$

where the trigonometric identity $(\sin \alpha - \sin \beta)/(\cos \alpha + \cos \beta) = \tan(\tfrac{1}{2}(\alpha-\beta))$ was used. Clearly, $\widehat{b(a_k)}$ is unbiased.

A symmetric magnitude of the Fourier transform is encountered in cases when, for example, the time domain signal corresponding to the frequency domain signal $z_{l,k}$ is real. A symmetric magnitude of the Fourier transform may also be encountered when $z_{l,k}$ represents the conjugate symmetric component of a signal, or when $z_{l,k}$ reflects a diversity combining operation whereby the symmetry occurs because of a superposition of several uncorrelated quantities. These examples are not intended to be exhaustive.

From the multiple angle formula $$\tan(nx) = \frac{\tan((n-1)x)\tan x}{1 - \tan((n-1)x)\tan x},$$

it is clear by induction that if $\tan((n-1)x) \approx (n-1)\tan x$ then $\tan(nx) \approx n \tan x$—as long as n, x are not large enough that $(n-1)\tan^2 x$ becomes comparable with 1. The relative error in approximating $\tan(nx) \approx n \tan x$ is plotted in double logarithmic scale for $10^{-6} \leq \zeta' \leq 10^{-4}$, with several values for n as a parameter. It is clear that for a significant practical range for $\zeta'$, n, the approximation $\tan(nx) \approx n \tan x$ holds very well.

Consider the new scalar function of $a_k$ $$B(a_k) \triangleq \frac{1}{2} b(a_k) = \frac{1}{k} \tan\left[\frac{1}{2}(\Delta\varphi_{k,(1)} - \Delta\varphi_{-k,(1)})\right] \quad (64)$$

$$= \tan(\zeta' k)/k = \tan\zeta'$$

1. and the estimate $$\widehat{B(\mathbf{a}_k)} = \widehat{b(\mathbf{a}_k)}/k \triangleq \frac{1}{k} \frac{\Im x_{l,k} - \Im x_{l,-k}}{\Re x_{l,k} + \Re x_{l,-k}} \quad (65)$$

For which the mean is $E\{\widehat{B(\mathbf{a}_k)}\} = \tan \zeta'$, making $\widehat{B(\mathbf{a}_k)}$ an unbiased estimator for $\tan \zeta'$.

The set of pilot indices C provides a set of $|C|/2$ unbiased estimates for $\tan \zeta'$, based on the complete and minimal sufficient statistics $x_{l,k}$, $k \in C$; $|C|$ denotes the cardinality of C. By the Rao-Blackwell theorem, averaging the $|C|/2$ unbiased estimates for $\tan \zeta'$ leads to a minimum variance unbiased estimator (MVUBE) for $\tan \zeta'$, which is unique because the sufficient statistic is complete. It is unique because there is one and only one function of a complete (thus minimal) sufficient statistic that is unbiased. Because it is unique, the MVUBE does achieve the Cramer-Rao bound. This means that all other estimators of $\tan \zeta'$ (or $\zeta'$, e.g. eq. (14) of Speth Part II,) are not optimal, in the sense that they are not uniformly better than all other estimators (i.e., they are not MVUBEs).

The MVUBE for $\tan \zeta'$ is $$E\{\widehat{B(\mathbf{a}_k)} \mid x_{l,k}, k \in C\} \triangleq \widehat{\tan \zeta'} = \frac{2}{|C|} \sum_{k \in C_+} \frac{1}{k} \frac{\Im x_{l,k} - \Im x_{l,-k}}{\Re x_{l,k} + \Re x_{l,-k}} \quad (66)$$

Note that it is the estimator for $\tan \zeta'$ that is unbiased, rather than the estimator for $\zeta'$ itself; in general, the ML estimator $\hat{\zeta}'$ $\triangleq$ arctan $(E\{\widehat{B(\mathbf{a}_k)} \mid x_{l,k}, k \in C\})$ is biased (apply Jensen's inequality). However, whenever $\zeta' < 0.5$, and certainly in the range $\zeta' \in [10^{-5}, 10^{-4}]$, which is representative of most practical applications of OFDM, $$\tan \zeta' \approx \zeta' \quad (67)$$

And thereby the MVUBE for $\zeta'$ is $$\hat{\zeta}'_{MVUB} = \frac{2}{|C|} \sum_{k \in C_+} \frac{1}{k} \frac{\Im x_{l,k} - \Im x_{l,-k}}{\Re x_{l,k} + \Re x_{l,-k}} \quad (68)$$

Naturally, the MVUBE for $\zeta$ is $$\hat{\zeta}_{MVUB} = \frac{1}{\pi(1 + N_g/N)|C|} \sum_{k \in C_+} \frac{1}{k} \frac{\Im x_{l,k} - \Im x_{l,-k}}{\Re x_{l,k} + \Re x_{l,-k}} \quad (69)$$

One can contrast the MVUBE for $\zeta$ given in (69) with the estimator given in eq. (14) of Speth Part II. Because there is one and only one function of a complete (thus minimal) sufficient statistic that is unbiased, all estimators different from (69) are not optimal; that is, they are not uniformly better than all other estimators, i.e., they are not MVUBEs. Note that this does not prevent the expectation of the unbiased estimator for $\Delta\varphi_{\pm k,(1)}$ of (51) (rather than $\zeta$, or $\Delta f$) from being a MVUBE, per Rao-Blackwell's theorem. In fact, the above derivations show that the Moose article did implement the average of an unbiased estimator of $\theta$ from (1) (see the Appendix in the Moose article), thereby in effect working with a MVUBE; what was not obvious was to correctly identify a MVUBE for $\zeta'$ and $\Delta f''_F$.

Having provided a MVUBE for $\zeta'$, a similar reasoning leads to a MVUBE for $\Delta f''_F$. Consider the scalar function of $a_k$ $$c(a_k) \triangleq \tan\left[\frac{1}{2}(\Delta\varphi_{k,(1)} + \Delta\varphi_{-k,(1)})\right] = \tan(\Delta f''_F) \quad (70)$$

and the estimate $$\widehat{c(\mathbf{a}_k)} \triangleq \frac{\Im x_{l,k} + \Im x_{l,-k}}{\Re x_{l,k} + \Re x_{l,-k}} \quad (71)$$

As before, (32) shows that averaging the ratio of differences between homologous components of the sufficient statistics for subcarriers k, −k, can be done by averaging the numerator and denominator separately; via (31), and because the magnitude of the Fourier transform is the same at symmetric (around zero) frequencies, i.e. $|z_{l,k}| = |z_{l,-k}|$, $$E\{\widehat{c(\mathbf{a}_k)}\} = \frac{|z_{l,k}|^2 \sin(\Delta f''_F + \zeta' k) + |z_{l,-k}|^2 \sin(\Delta f''_F - \zeta' k)}{|z_{l,k}|^2 \cos(\Delta f''_F + \zeta' k) + |z_{l,-k}|^2 \cos(\Delta f''_F - \zeta' k)} \quad (72)$$

$$= \tan(\Delta f''_F)$$

where the trigonometric identity $(\sin \alpha + \sin \beta)/(\cos \alpha + \cos \beta) = \tan(\frac{1}{2}(\alpha+\beta))$ was used. Clearly, $\widehat{c(\mathbf{a}_k)}$ is unbiased and based on a sufficient statistic. By the Rao-Blackwell theorem, averaging the $|C|/2$ unbiased estimates for $\tan(\Delta f''_F)$ leads to a minimum variance unbiased estimator (MVUBE) for $\tan \Delta f''_F$, which is unique because the sufficient statistic is complete. Because it is unique, the MVUBE does achieve the Cramer-Rao bound. The MVUBE for $\tan \Delta f''_F$ is $$E\{\widehat{c(a_c)} \mid x_{l,k}, k \in C\} \triangleq \widehat{\tan \Delta f''_F} \quad (73)$$

$$= \frac{2}{|C|} \sum_{k \in C_+} \frac{\Im x_{l,k} + \Im x_{l,-k}}{\Re x_{l,k} + \Re x_{l,-k}}$$

As before, via $\tan \Delta f''_F \approx \Delta f''_F$, the MVUBE for $\Delta f''_F$ is $$\widehat{\Delta f''_F}^{MVUBE} = \widehat{\Delta f_c T_u}^{MVUBE} = \frac{1}{\pi(1 + N_g/N)|C|} \sum_{k \in C_+} \frac{\Im x_{l,k} + \Im x_{l,-k}}{\Re x_{l,k} + \Re x_{l,-k}} \quad (74)$$

Again, the MVUBE for $\Delta f''_F$ given in (74) is clearly distinct from the estimator given in eq. (14) of Speth Part II. It is stressed again that the MVUBEs derived above for both $\zeta$ and $\Delta f_F T_u$ are novel, and need not rely on the channel estimator—which has inherent errors and could irreversibly degrade the performance of a synchronization algorithm that needs channel estimates.

When correctly implemented, the expectation operation averages out the additive noise, including the ICI term $n_{\Omega; l,k}$ (or frequency offset noise, as ICI is called in Speth Part I), which degrades the SNR. In addition, combining the pilot observables, when possible, can further reduce the SNR degradation.

The above steps do not exhaust the ways for implementing this method, or a related apparatus; for example one can add, remove, or modify steps. In one alternate embodiment a step might be added to retrieve a conjugate symmetric component, or a conjugate asymmetric component of the observations or their corresponding statistic, or metric. In another embodiment the estimates might be performed before combining the relevant statistics or metrics, as for example in diversity combining, and the estimates combined thereafter.

Combining operation may, in some embodiments, average out the additive noise terms, including the ICI term $n_{\Omega; l,k}$ (or frequency offset noise, as ICI is sometimes called, e.g. in Speth, Part I), which degrades the SNR. Therefore, combining the pilot observables can reduce the SNR degradation due to imperfect carrier frequency synchronization.

Figure 2:
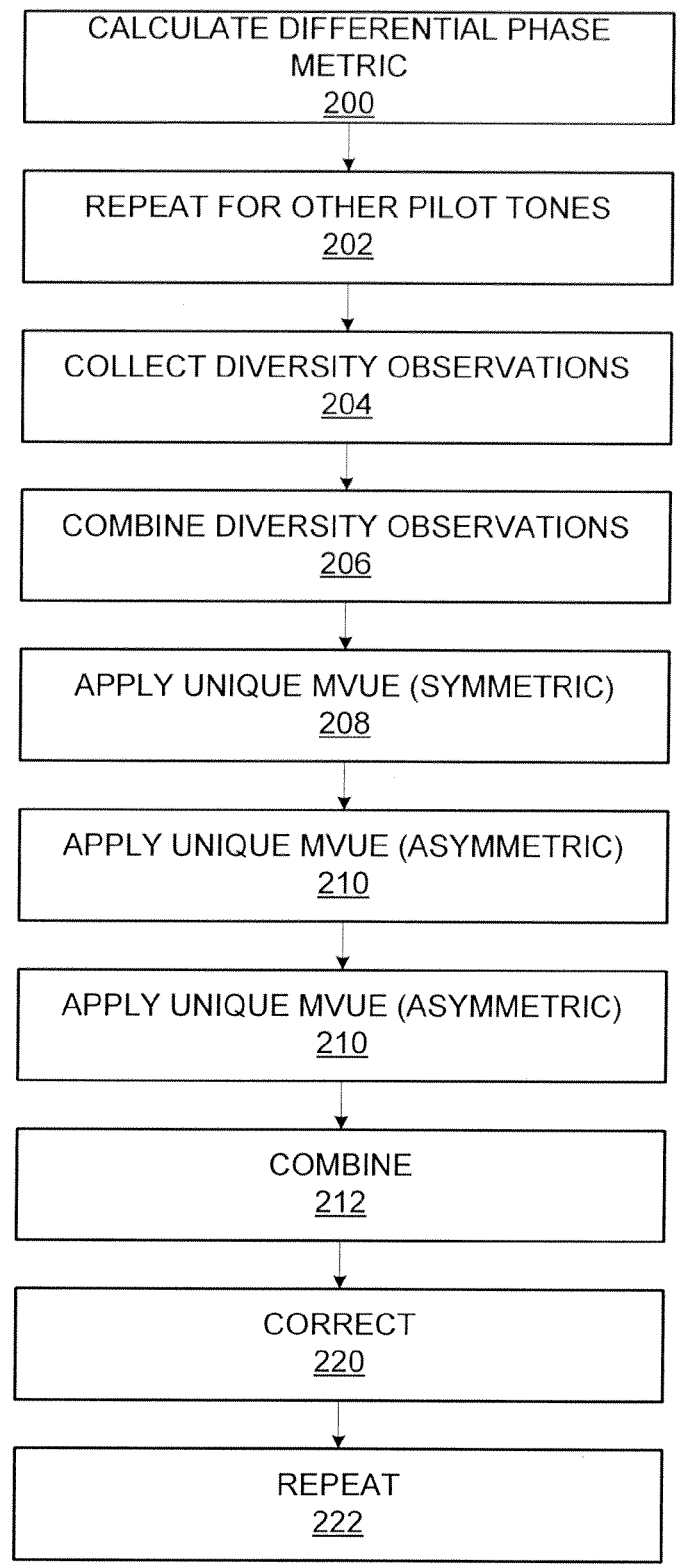
FIG. 2, is a flowchart illustrating an example system in accordance with the systems and methods described herein.

FIG. 2 is a flowchart illustrating an example system in accordance with the systems and methods described herein. In a step 200 a differential phase metric is calculated. In some embodiments, the differential phase metric may be calculated at pilot tone k between two consecutive OFDM symbols sent in the same frequency band; naturally, this translates into observing, in the frequency domain, at least two consecutive OFDM symbols, or as many as the number of active spectral hop bands plus one.

In a step 202, the calculation is repeated for other pilot tones, or all tones that are to be used in estimating the carrier and sampling clock relative frequency offsets. In some embodiments, for example, in a diversity based system, this may be done for all subcarriers that are to be used in estimating the carrier and sampling clock relative frequency offsets. Additionally, in a step 204, if more than one diversity branches are available, collect diversity observations on the same pilot tones, during a number of uncorrelated diversity branches, e.g. frequency hops. Further, in systems with more than one diversity branches diversity observations of the (sufficient) differential synchronization statistic are combined in a step 206.

In a step 208, an estimator is used. The unique minimum variance unbiased estimator for the carrier and sampling clock relative frequency offsets is applied, as described above or with reasonable simplifications. Some embodiments may work with a symmetric representation of the frequency domain signal, such as a conjugate symmetric component retrieved from the original observables. In some embodiments, the systems and methods described herein may process a symmetric representation of a frequency domain signal, such as a CS component retrieved from original observables. In various embodiments, a valid estimator for the carrier and sampling clock relative frequency offsets may be used.

In a step 210, other embodiments apply the unique minimum variance unbiased estimator without resorting to a symmetric component such as a conjugate symmetric component retrieved from the original observables.

In a step 212 estimates are combined. The estimates may be combined, for example, by summing them. In a step 220, various embodiments correct the local oscillator frequency. For example, the systems and methods may correct the local oscillator(s) frequency, or form and apply a correction to the demodulated samples (post DFT) based on the estimated synchronization parameters. This correction may be done in parallel in some embodiments.

In some embodiments, the estimation may be repeated. For example, in a step 222 the estimation procedure may be repeated throughout the duration of the packet.

The above steps do not exhaust the ways for implementing this method, or a related apparatus; for example one can add, remove, or modify steps. In one alternate embodiment a step might be added to retrieve a conjugate symmetric component, or a conjugate asymmetric component of the observations or their corresponding statistic, or metric. In another embodiment the estimates might be performed before combining the relevant statistics or metrics, as for example in diversity combining, and the estimates combined thereafter. Or one can modify the differential metric or use an approximation thereof.

An additional and important benefit is that the combining operation can average out the additive noise terms, including the ICI term $n_{\Omega; l,k}$ (or frequency offset noise, as ICI is sometimes called, e.g. in [0011]), which degrades the SNR. Therefore, combining the pilot observables can reduce the SNR degradation due to imperfect carrier frequency synchronization.

In the embodiments described above, the sufficient statistics for frequency offset estimation were generated on a per-tone basis and pairs of statistics for corresponding negative and positive tones were processed pair-wise. In further embodiments, the tones may be combined to form a statistic located at the center of gravity of all positive tones, frequency-wise, and a statistic located at the center of gravity of all negative tones, frequency-wise. These embodiments may be particularly beneficial when employed in a system utilizing feed back. One example embodiment of such a feedback system is illustrated in FIGS. 3 and 4.

Figure 3:
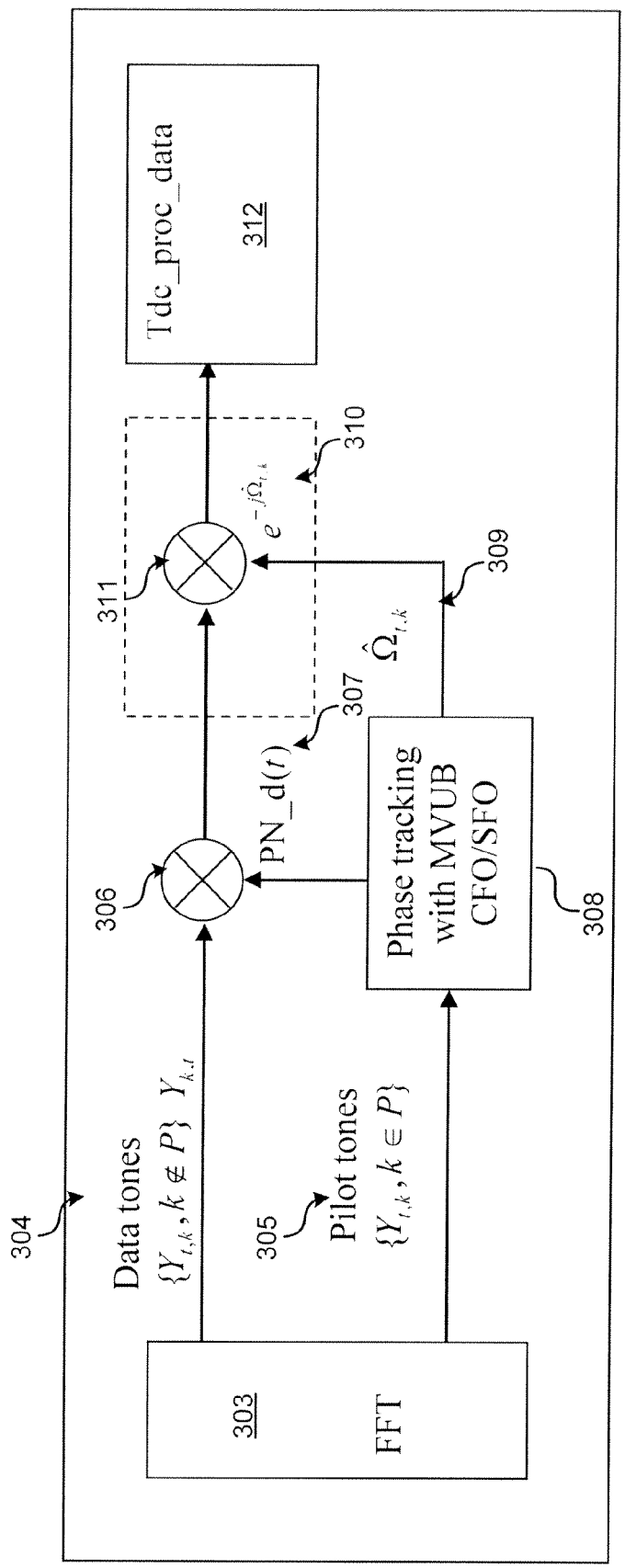
FIG. 3 is an illustrating of a phase compensation subsystem implemented in accordance with an embodiment of the invention.
Figure 4:
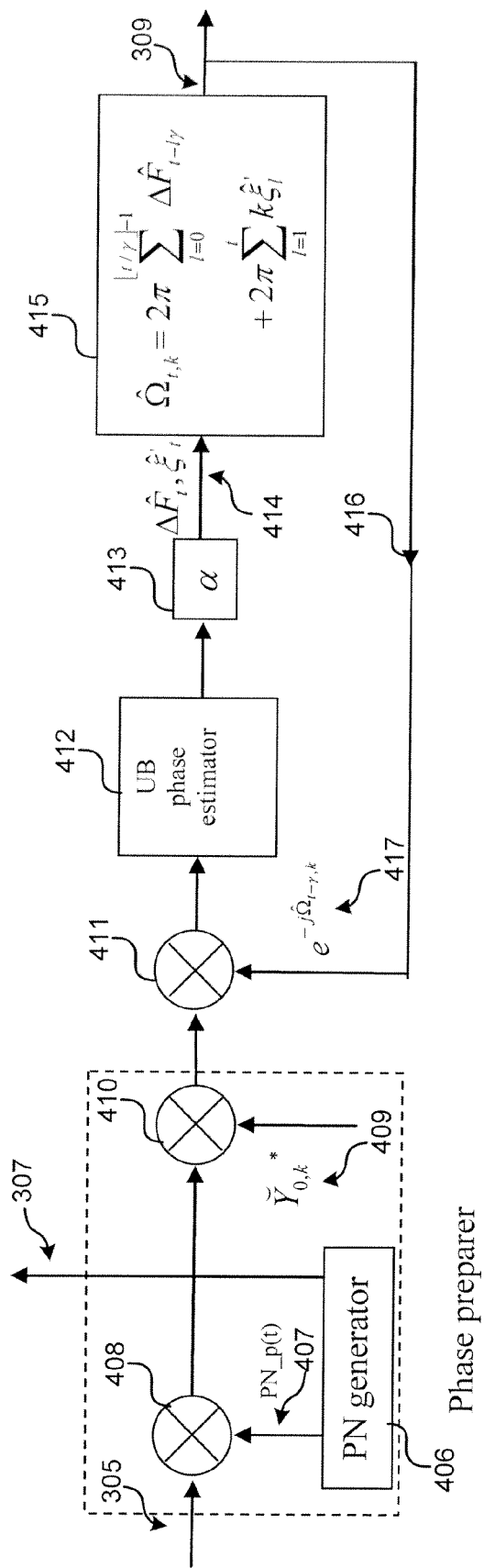
FIG. 4 is an illustrating of a phase tracking and estimation subsystem implemented in accordance with an embodiment of the invention.

FIG. 3 illustrates a high-level diagram of a phase tracking subsystem. After receiving an OFDM symbol, time domain processing is performed, for example coarse frequency offset correction. The, the time domain symbol is transformed into the frequency domain at a Fast Fourier Transform module 303. For an OFDM symbol, t, the output is a set of data on a plurality of tones $\{Y_{t,k}\}$, where k indexes the tones. In the illustrated embodiment, the output data includes data 305 sent on a set of pilot tones, P, which comprises predetermined sequences known to the transmitter and receiver and configured to aid in frequency offset correction. The output further comprises data 305 sent on data tones, which has the modulated data to be processed. The pilot tones 305, $\{Y_{t,k}, k \in P\}$, are provided to the phase tracking module 308. Although in some embodiments, pilot tones refer to pre-determined tones for estimation where the data on the tones is known a priori, in further embodiments, any other tones where the data on the tone may be determined may be used as pilot tones. The phase tracking module 308 determines a set of estimated frequency offsets 309, $\hat{\Omega}_{t,k}$, for the symbol t, and tones k. The data tone outputs 304, $\{Y_{t,k}, k \notin P\}$, are rotated by multiplying 311 by a phase rotation 310 determined using the offsets 309, to compensate for the phase error. The compensated data is then provided to processing module 312 for further processing and demodulation. In some embodiments, scrambling may be used in data transmission, for example using a pseudonoise or pseudorandom sequence. In these embodiments, the phase tracking module 308 may be further configured to reverse the scrambling using the scrambling sequence 307, PN_d(t), and multiplier 305. In these embodiments, the data provided to multiplier 311 is the descrambled data.

As discussed above, in the post-FFT domain, there are two major sources that can cause time-varying, tone dependent phase offset. One is the relative sampling clock frequency offset (SFO), $\xi$, that is due to the sampling interval mismatch between transmitter and receiver; it is defined as $\xi \triangleq (T'-T)/T = (1/T - 1/T')/1/T'$, i.e. the sampling frequency offset between transmitter and receiver, normalized to the receiver's sampling clock frequency 1/T'. The phase offset due to SFO is tone-dependent, and symmetric across DC. The other source is the residual CFO, $\Delta f$, that is due to the correction error after coarse carrier frequency offset (CFO) estimation and correction in the time domain. The normalized CFO $\Delta fT_u$ is $\Delta f' \triangleq \Delta fT_u = n_I + \Delta f'_F$, with $\Delta f'_F < 1$, where $T_u$ is the duration of the proper OFDM symbol (cyclic prefix, or zero suffix, excluded, i.e. $T_u^{-1}$ is the subcarrier spacing). The normalized integer CFO is manifested in a shift of the frequency domain DFT samples, and is corrected separately from the fractional normalized carrier frequency offset $\Delta f'_F$. Both residual CFO and SFO are usually small, however, they can introduce a relative large cumulative phase offset for a long packet and thus deteriorate the decoder's performance.

For the remainder, $Y_{t,k}$ denotes the output of FFT at tone k in the t-th OFDM symbol, and $\Omega_{t,k}$ denotes the phase offset due to SFO and residual CFO. Then, $$Y_{t,k} = \hat{H}_k X_k e^{j\Omega_{t,k}} + W_{t,k} = \beta e^{j\Omega_{t,k} + \phi_{\hat{H}_k} + \phi_{X_k}} + W_{t,k} \quad (75)$$

$$\Omega_{t,k} = \frac{2\pi N_s}{N}(t\Delta f + tk\xi) \quad (76)$$

where $\hat{H}_k$, $X_k$ and $W_{t,k} \propto CN(0, N_0)$ are estimated channel coefficient at tone k, the transmitted data at tone k and the additive noise; N=165 is the number of time samples (chips) in one OFDM symbol, and N=128 is the size of FFT; $\Delta f'_F$ is the fractional residual CFO normalized with respect to the subcarrier spacing;

$$\beta = |\hat{H}_k X_k|; \varphi_{\hat{H}_k}$$

and $$\varphi_{X_k}$$

are the phases of $\hat{H}_k$ and $X_k$, respectively.

An OFDM packet typically comprises a plurality of OFDM symbols. In one embodiment, a receiver system tracks the phase of the OFDM symbols as they relate to an initial OFDM symbol, such as an initial symbol in an OFDM packet. The purpose of phase tracking is to eliminate the distortion due to the phase rotation $\Omega_{t,k}$. This can be achieved by estimating $\Omega_{t,k}$ from the pilot tones, then compensating for it on data tones using the estimate. Since the phase offset is cumulative, the design principle of phase tracking is to minimize the mean square error after compensation, for every OFDM symbol in the packet, instead of the mean square of estimation error. This is illustrated by reviewing the compensation error at the t-th OFDM symbol. Assume that $\{\widehat{\Delta f'_{T;l}}\}_{l=1}^t$ and $\{\hat{\xi}_l\}_{l=1}^t$ are the estimates of residual CFO and SFO of the OFDM symbols at l=0, 1, 2, . . . , t. The compensated data tones in the t-th OFDM symbol is given by $$\hat{Y}_{t,k} = Y_{t,k} e^{-j t_k}. \quad (77)$$

FIG. 4 illustrates an example of a phase estimation and tracking subsystem implemented in accordance with an embodiment of the invention. The illustrated subsystem may be used to perform the functions of phase tracking module 308, as illustrated in FIG. 3. In the illustrated embodiment, the pilot tones are scrambled as well as the data tones. A descrambling sequence generator 406 generates the descrambling sequence 307 for the data tones 304 and a sequence, PN_p(t), for descrambling the pilot tones 305. The pilot tone output 305 of the FFT 303 are then descrambled at multiplier 408 and the descrambling sequence 307 is passed to multiplier 306. In multiplier 410, a statistic for phase estimation is generated. The input $Y_{t,k}$ (here, descrambled) conjugate multiplies 410 with $\check{Y}_{0,k\ 0,k}$, where $\check{Y}_{0,k\ 0,k}$ is the kth output of a reference OFDM symbol and is the product of pilot signal $P_k$ and estimated channel $\hat{H}_k$ at tone, i.e., $$\check{Y}_{0,k} = P_k \hat{H}_k. \quad (78)$$

$\check{Y}_{0,k}$ is used to allow the phase tracking subsystem to track the phase offset from the initial OFDM symbol of an OFDM packet, at t=0. At this symbol, the channel is first. 0. 00 estimation at 0. In some embodiments, the phase offset is not tracked in relation to an initial symbol, but rather is performed in relation to an immediately preceding symbol on the same frequency band. In these embodiments, $\check{Y}_{0,k}$ may be substituted with $Y_{t-\gamma,k}$, where $Y_{t-\gamma,k}$ is the (descrambled) output of the FFT for the preceding OFDM symbol t−γ, where γ refers to the previous OFDM symbol sent on the same frequency band. The parameter γ is defined as the interval (number of OFDM symbols) between two consecutive OFDM symbols transmitted over the same band. In some embodiments, particularly embodiments employing frequency band hopping γ may differ from 1. For example, an embodiment might employ band hopping over three frequency bands with the pattern: <1, 1, 2, 2, 3, 3, 1, 1, . . . >. In such an embodiment, 1 would alternate between 1 and 5, so that OFDM symbols on the same bands were always compared.

The output of phase preparer 410 then multiplies 411 with $e^{-j t_k}$ 417 to generate the input to MVUB phase estimator 412, where $\hat{\Omega}_{t-\gamma,k}$ is the feedback from phase accumulator 415 and is used to compensate data tone k in the last same-band OFDM symbol, i.e., OFDM symbol indexing at t−γ. In the illustrated embodiment, the $\hat{\Omega}_{0,k}$ is initialized to zero.

Figure 5:
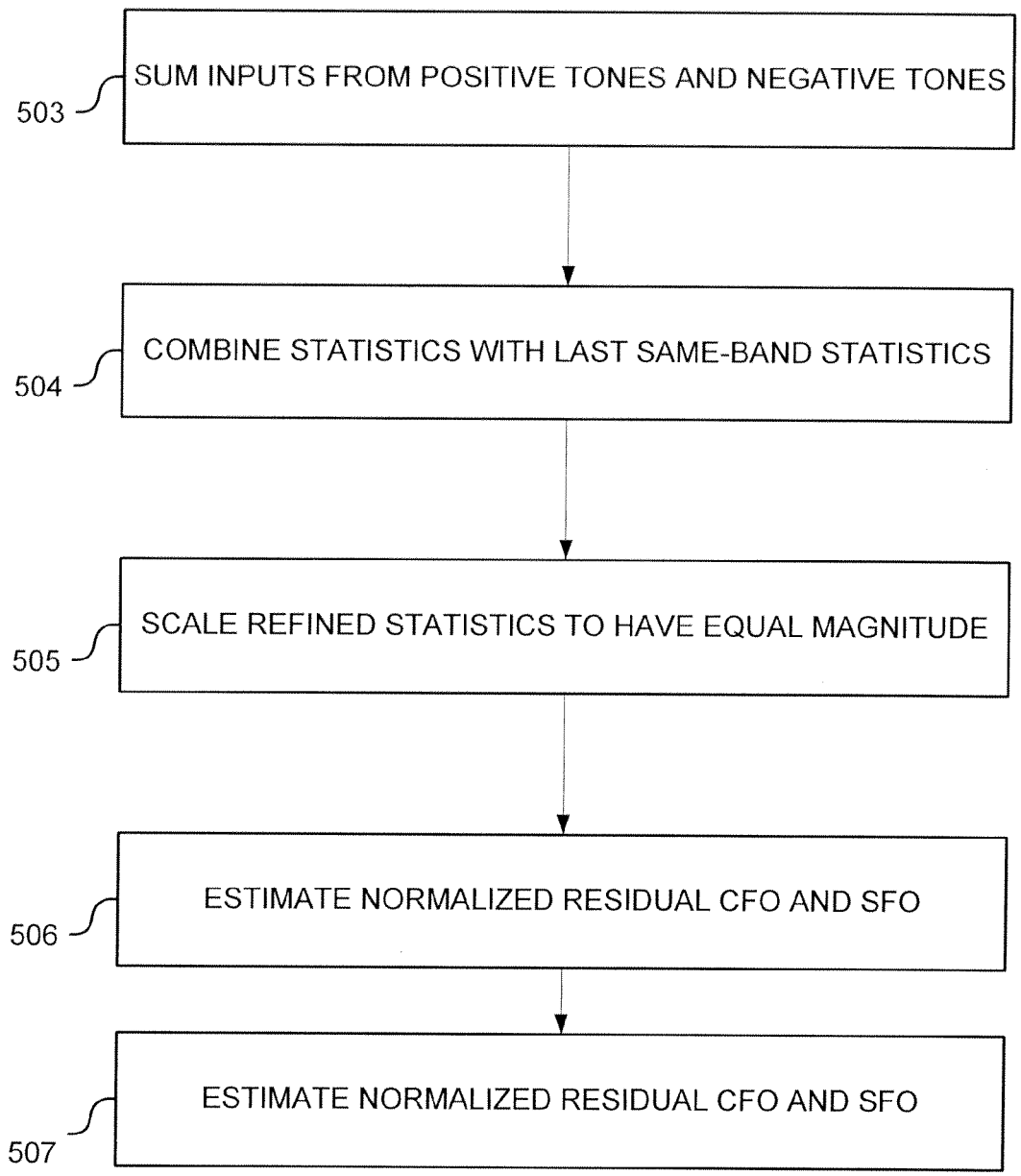
FIG. 5 is a flowchart of a method for estimation implemented in accordance with an embodiment of the invention.

The MVUB phase estimator 412 estimates the normalized, fractional, residual CFO and the normalized SFO, as described with respect to FIG. 5. In step 503, the estimator 412 combines the inputs on the positive tones to generate a virtual tone in the center of mass of the positive pilot tones and combines the inputs on the negative tones to generate a virtual tone in the center of mass of the negative pilot tones. To perform this, the estimator 412 computes the sums of inputs from all positive tones and negative tones, i.e., $\rho_+(t)$ and $\rho_-(t)$, respectively, to generate an estimation statistic associated with a positive virtual tone and an estimation statistic associated with a negative virtual tone. The sums are used as estimation statistics to estimate the CFO and SFO.

$$\rho_+(t) = \sum_{k \in P^+} Y_{t,k} \breve{Y}^*_{0,k} e^{-j\hat{\Omega}_{t-\gamma,k}} \text{ and } \rho_-(t) = \sum_{k \in P^-} Y_{t,k} \breve{Y}^*_{0,k} e^{-j\hat{\Omega}_{t-\gamma,k}} \quad (79)$$

where $P^+$ and $P^-$ are sets of indexes of positive pilot tones and negative pilot tones, respectively. For example, in an embodiment used in a communication system according the WiMedia OFDM communication protocol, $P^+$=[5, 15, 25, 35, 45, 55] and $P^-$=[−5, −15, −25, −35, −45, −55]. In this operation, a current set of Fourier transform outputs are multiplied by an a conjugate of an emulation of a homologous set of Fourier transform outputs of a previous OFDM symbol t−γ. The homologous set is determined by applying an accumulated phase rotation $\hat{\Omega}_{t-\gamma,k}$ to the reference symbol $\breve{Y}_{0,k} = P_k \hat{H}_k$, where homologous refers to same tones as the current set of Fourier transform outputs.

In another embodiment, rather than single virtual tone estimation statistics, the statistics may be determined on a tone by tone basis, to provide sets of estimation statistics:

$$\{\rho_+(t,k)\}_{k \in P^+} = \{Y_{t,k} Y^*_{t-\gamma,k}\}_{k \in P^+} \text{ and } \{\rho_-(t,k)\}_{k \in P^-} = \{Y_{t,k} Y^*_{t-\gamma,k}\}_{k \in P^-} \quad (80)$$

In (80) the statistics are formed using the outputs of a Fourier transform for the previous symbol t−γ. In other embodiments, the sets of estimation statistics may also be formed in reference to a reference symbol:

$$\{\rho_+(t,k)\}_{k \in P^+} = \{Y_{t,k} \breve{Y}^*_{0,k} e^{-j\hat{\Omega}_{t-\gamma,k}}\}_{k \in P^+} \text{ and} \quad (81)$$

$$\{\rho_-(t,k)\}_{k \in P^-} = \{Y_{t,k} \breve{Y}^*_{0,k} e^{-j\hat{\Omega}_{t-\gamma,k}}\}_{k \in P^-}. \quad (82)$$

In some embodiments, in step 504, the estimator 412 refines the statistics by combining with the last same-band statistics:

$$\rho_+ = \rho_+(t-\gamma) + \rho_+(t) = \quad (83)$$
$$\sum_{k \in P^+} Y_{t-\gamma,k} \breve{Y}^*_{0,k} e^{-j\hat{\Omega}_{t-\gamma-\gamma,k}} + \sum_{k \in P^+} Y_{t,k} \breve{Y}^*_{0,k} e^{-j\hat{\Omega}_{t-\gamma,k}} \text{ and}$$

$$\rho_- = \rho_-(t-\gamma) + \rho_-(t) = \quad (84)$$
$$\sum_{k \in P^-} Y_{t-\gamma,k} \breve{Y}^*_{0,k} e^{-j\hat{\Omega}_{t-\gamma-\gamma,k}} + \sum_{k \in P^-} Y_{t,k} \breve{Y}^*_{0,k} e^{-j\hat{\Omega}_{t-\gamma,k}}.$$

In embodiments using sets of estimation statistics, an analogous procedure may be performed. In other embodiments, step 504 may be omitted.

In further embodiments, the statistic may be modified using diversity combining for phase tracking using multiple bands. Diversity combining averages the statistics $\rho_+(t)$ and $\rho_-(t)$ of all different bands used in frequency hopping instead of the same band statistics as given in Eq. (83) and (84). For example, in a three-band frequency hopping pattern <A, B, C, A, B, C>, this would be done by averaging $\rho_+(t)$ and $\rho_-(t)$ of the most three recent OFDM symbols as follows:

$$\rho_+ = \rho_+(t-2) + \rho_+(t-1) + \rho_+(t) = \sum_{k \in P^+} Y_{t-2,k} \breve{Y}^*_{0,k} e^{-j2\pi\hat{\Omega}_{t-\gamma-2,k}} + \quad (85)$$
$$\sum_{k \in P^+} Y_{t-1,k} \breve{Y}^*_{0,k} e^{-j2\pi\hat{\Omega}_{t-\gamma-1,k}} + \sum_{k \in P^+} Y_{t,k} \breve{Y}^*_{0,k} e^{-j2\pi\hat{\Omega}_{t-\gamma,k}} \text{ and}$$

$$\rho_- = \rho_-(t-2) + \rho_-(t-1) + \rho_-(t) = \sum_{k \in P^-} Y_{t-2,k} \breve{Y}^*_{0,k} e^{-j2\pi\hat{\Omega}_{t-\gamma-2,k}} + \quad (86)$$
$$\sum_{k \in P^-} Y_{t-1,k} \breve{Y}^*_{0,k} e^{-j2\pi\hat{\Omega}_{t-\gamma-1,k}} + \sum_{k \in P^-} Y_{t,k} \breve{Y}^*_{0,k} e^{-j2\pi\hat{\Omega}_{t-\gamma,k}}.$$

In step 505, the estimation statistics are refined so that they have equal magnitude. $\rho_-$ and $\rho_+$ are scaled in order to have equal magnitude. In embodiment, the positive statistic is multiplied by the magnitude of the negative statistic, and vice versa.

$$\bar{\rho}_- = |\rho_+| \rho_- \text{ and } \bar{\rho}_+ = |\rho_-| \rho_+. \quad (87)$$

In step 506, the normalized residual CFO and SFO are estimated using the refined and scaled statistics:

$$\Delta \hat{F}_t = \text{Arctan}\left(\frac{\text{Im}(\bar{\rho}_-) + \text{Im}(\bar{\rho}_+)}{\text{Re}(\bar{\rho}_-) + \text{Re}(\bar{\rho}_+)}\right) \quad (88)$$

$$\hat{\xi}'_t = \frac{1}{30\gamma} \text{Arctan}\left(\frac{\text{Im}(\bar{\rho}_+) - \text{Im}(\bar{\rho}_-)}{\text{Re}(\bar{\rho}_+) + \text{Re}(\bar{\rho}_-)}\right). \quad (89)$$

In embodiments employing sets of estimatin statistics, the CFO and SFO may be estimated for each homologos tone pair (each mirror tone pair) to generate a set of SFO and SFO estimations. The sets may then be used to generate a CFO and SFO for the entire symbole, for example through averaging.

After the phase estimator 412, a filter 413, applies a path gain, α, to the estimated CFO and SFO.

$$\Delta \hat{F}_t = \alpha \text{ Arctan}\left(\frac{\text{Im}(\bar{\rho}_-) + \text{Im}(\bar{\rho}_+)}{\text{Re}(\bar{\rho}_-) + \text{Re}(\bar{\rho}_+)}\right) \quad (90)$$

$$\hat{\xi}'_t = \frac{\alpha}{30\gamma} \text{Arctan}\left(\frac{\text{Im}(\bar{\rho}_+) - \text{Im}(\bar{\rho}_-)}{\text{Re}(\bar{\rho}_+) + \text{Re}(\bar{\rho}_-)}\right). \quad (91)$$

Additionally, $$\Delta \hat{F}_t = \gamma \frac{N_s}{N} \Delta \hat{f}_t \text{ and } \hat{\xi}'_t = \frac{N_s}{N} \hat{\xi}_t.$$

In the illustrated embodiment, the loop filter 413 is a simple path gain, α, which is chosen according to data rate. For example a WiMedia-based communication system, α may be selected as 0.5 for rates of 53.3 and 80 mbps, 0.25 for the rates of 106.7, 160, 200, 320, 400 and 480 mbps. In other embodiments, α may be selected in different manners or removed from the system.

In further embodiments, clipping may be used to ensure that $\Delta \hat{F}_t$ and $\hat{\xi}'_t$ are within predetermined bounds. For example, the clocks used in transmitters and receivers may fall within predetermined ranges of each other. For example, the communications protocol used in transmitting the OFDM symbols may dictate a standard clock offset, for example less than 40 ppm. In these embodiments, in step 507, $\Delta \hat{F}_t$ and $\hat{\xi}'_t$ are thresholded such that $\Delta\hat{F}_t$ and $\hat{\xi}'_t$ fall within a certain range. In one embodiments, $\Delta\hat{F}_t$ and $\hat{\xi}'_t$ are thresholded such that $$-MAX\_PE\_SLOPE \leq \hat{\xi}'_t \leq MAX\_PE\_SLOPE \quad (92)$$

$$-MAX\_PE\_COMM \leq \Delta\hat{F}_t \leq MAX\_PE\_COMM, \quad (93)$$

where
MAX_PE_SLOPE=MAX_PE_DIFF/60 for all the rates, and
MAX_PE_COMM=0.0625 for rates of 53.3 and 80 mbps, and
MAX_PE_COMM=0.03125 for all the other rates, and
MAX_PE_DIFF=0.015625.

Module 415 receives the CFO and SFO estimates and provides a phase rotation estimate 309 for phase correction at module 311 and for feedback 416 for use in determining the statistics for the next OFDM symbol. For OFDM symbol t and tone k, the total phase rotation $\hat{\Omega}_{t,k}$ is determined as:

$$\hat{\Omega}_{t,k} = 2\pi \left( \sum_{l=0}^{\lfloor t/\gamma \rfloor - 1} \Delta\hat{F}_{t-\gamma l} + \sum_{l=1}^{t} k\hat{\xi}'_l \right). \quad (94)$$

Additionally, there is sometimes a need to have an estimated SFO with minimum mean-square-error, which can be easily achieved by running averaging over the $\{\hat{\xi}'_l\}_{l=1}^t$ via $$\xi_{a,t} = \frac{1}{t} \sum_{l=1}^{t} \hat{\xi}'_l. \quad (95)$$

In embodiments implementing diversity combining the residual CFO of three hopping bands are different (the center frequencies of three bands are different), the averaging in Eq. (85) and (86) over three bands will always end up with the statistics of CFO in the middle band. Therefore, the residual CFO estimate has to be adjusted for OFDM symbols in the left band and in the right band. For the symbols in the left band, the adjusted CFO estimate is given by $$\Delta\hat{F}_t = \frac{f_c - 528 \text{ MHz}}{f_c} \alpha \text{ Arctan}\left( \frac{\text{Im}(\overline{p}_-) + \text{Im}(\overline{p}_+)}{\text{Re}(\overline{p}_-) + \text{Re}(\overline{p}_+)} \right) \quad (96)$$

where 528 MHz is the band width and $f_c$ is the center frequency of the middle band. For the symbols in the right band, the adjusted CFO estimated is given by $$\Delta\hat{F}_t = \frac{f_c + 528 \text{ MHz}}{f_c} \alpha \text{ Arctan}\left( \frac{\text{Im}(\overline{p}_-) + \text{Im}(\overline{p}_+)}{\text{Re}(\overline{p}_-) + \text{Re}(\overline{p}_+)} \right). \quad (97)$$

The systems and methods described herein may be implemented using a computer. In one embodiment the computer may be a desktop, laptop, or notebook computer. In another embodiment the computer may be a mainframe, supercomputer or workstation. In yet another embodiment the computer may be a hand-held computing device such as a PDA, smart phone, cell phone 718, palmtop, etc. The computer may also represent computing capabilities embedded within or otherwise available to a given device.

The computer may include one or more processors, which may be microprocessors, microcontrollers, or other control logic and memory, such as random access memory ("RAM"), read only memory ("ROM") or other storage device for storing information and instructions for the processor. Other information storage mechanisms may also be connected to the computer, such as a hard disk drive, a floppy disk drive, a magnetic tape drive, an optical disk drive, a CD or DVD drive (R or RW), or other removable or fixed media drive, such as a program cartridge and cartridge interface, a removable memory (for example, a flash memory or other removable memory module) and memory slot, a PCMCIA slot and card, and other fixed or removable storage units and interfaces that allow software and data to be transferred from the storage unit to the computer.

The computer may also include a communications interface that may be used to allow software and data to be transferred between the computer and external devices. Examples of the communications interface may include a modem or softmodem, a network interface (such as an Ethernet, network interface card, or other interface), a communications port (such as for example, a USB port, IR port, RS232 port or other port), or other wired or wireless communications interface. Software and data transferred via the communications interface are carried on signals, which may be electronic, electromagnetic, optical or other signals capable of being received by a given communications interface. The signals may be provided to the communications interface using a wired or wireless medium. Some examples of a channel may include a phone line, a cellular phone link, an RF link, an optical link, a network interface, a local or wide area network, the internet, and other communications channels.

In this document, the terms "computer program medium" and "computer usable medium" are used to generally refer to media such as, for example, the memory, storage unit, media, and signals on a channel. These and other various forms of computer usable media may be involved in carrying one or more sequences of one or more instructions to the processor for execution. Such instructions, generally referred to as "computer program code" (which may be grouped in the form of computer programs or other groupings), when executed, enable the computer to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

What is claimed is:

1. A method, implemented in a system, comprising:
obtaining a previous OFDM symbol transmitted on a frequency band;
obtaining a current OFDM symbol transmitted on the frequency band;
computing a current set of outputs of the current OFDM symbol at a plurality of pilot tones, the plurality of pilot tones comprising a plurality of positive pilot tones and a plurality of negative pilot tones;
obtaining a homologous set of Fourier transform outputs of the previous OFDM symbol at the plurality of pilot tones;
determining a set of positive tone estimation statistics, corresponding to the plurality of positive pilot tones, the determination performed tone-wise from the elements corresponding to the positive pilot tones of the current set and the homologous elements corresponding to the positive pilot tones of the homologous set;
determining a set of negative tone estimation statistics, corresponding to the plurality of negative pilot tones, the determination performed tone-wise from the elements corresponding to the negative pilot tones of the current set and the elements corresponding to the negative pilot tones of the homologous set;
refining the set of positive tone estimation statistics by tone-wise scaling each element of the set of positive tone estimation statistics by the magnitude of the homologous element of the set of negative tone estimation statistics;
refining the set of negative tone estimation statistics by tone-wise scaling each element of the set of negative tone estimation statistics by the magnitude of the homologous element of the set of positive tone estimation statistics;
obtaining a current set of CFO estimates for each homologous pair of negative and positive tones from the set of positive tone estimation statistics and the set of negative tone estimation statistics; and
determining a phase rotation for phase compensation from the current set of CFO estimates.

2. The method of claim 1, wherein the homologous set of outputs is an emulation of Fourier transform outputs corresponding to the previous OFDM symbol and obtained by applying a phase rotation estimate to a reference OFDM symbol, wherein the phase rotation estimate compensates for frequency offsets up to and including the previous OFDM symbol.

3. The method of claim 1, wherein $\{\rho_+(t,k)\}_{k \in P^+} = \{Y_{t,k} Y^*_{t-\gamma,k}\}_{k \in P^+}$ and $\{\rho_-(t,k)\}_{k \in P^-} = \{Y_{t,k} Y^*_{t-\gamma,k}\}_{k \in P^-}$, where $\{\rho_+(t,k)\}_{k \in P^+}$ is the set of positive tone estimation statistics before the step of refining, $\{\rho_-(t,k)\}_{k \in P^-}$ is the set of negative tone estimation statistics before the step of refining, t is an index of the current OFDM symbol, t−γ is the index of the previous OFDM symbol in the same frequency band, $P^+$ is the plurality of positive pilot tones, $P^-$ is the plurality of negative pilot tones, k indexes a tone element of the plurality of pilot tones, $Y_{t,k}$ is the kth element of the current set of Fourier transform outputs, and $Y^*_{t-\gamma,k}$ is the kth element of the homologous set of Fourier transform outputs.

4. The method of claim 3, wherein the step of obtaining the current set of CFO estimates comprises determining the ratio $$\left(\frac{\text{Im}(\bar{\rho}_-) + \text{Im}(\bar{\rho}_+)}{\text{Re}(\bar{\rho}_-) + \text{Re}(\bar{\rho}_+)}\right)$$

for each homologous pair of positive and negative tones in the plurality of pilot tones, where $\bar{\rho}_+$ is an element of the set of positive tone estimation statistics after the step of refining, and $\bar{\rho}_-$ is an element of the set of negative tone estimation statistics after the step of refining.

5. A system for determining a frequency offset comprising:
   an antenna;
   a processor, coupled to the antenna; and
   a memory, coupled to the processor and configured to store instructions causing the processor to perform the steps of:
      obtaining a previous OFDM symbol transmitted on a frequency band
      obtaining a current OFDM symbol transmitted on the frequency band;
      computing a current set of outputs of a Fourier transformation of the current OFDM symbol at a plurality of pilot tones, the plurality of pilot tones comprising a plurality of positive pilot tones and a plurality of negative pilot tones;
      obtaining a homologous set of outputs of the Fourier transformation of the previous OFDM symbol at the plurality of pilot tones;
      determining a set of positive tone estimation statistics, corresponding to the plurality of positive pilot tones, the determination performed tone-wise from the elements corresponding to the positive pilot tones of the current set and the homologous elements corresponding to the positive pilot tones of the homologous set;
      determining a set of negative tone estimation statistics, corresponding to the plurality of negative pilot tones, the determination performed tone-wise from the elements corresponding to the negative pilot tones of the current set and the elements corresponding to the negative pilot tones of the homologous set;
      refining the set of positive tone estimation statistics by tone-wise scaling each element of the set of positive tone estimation statistics by the magnitude of the homologous element of the set of negative tone estimation statistics;
      refining the set of negative tone estimation statistics by tone-wise scaling each element of the set of negative tone estimation statistics by the magnitude of the homologous element of the set of positive tone estimation statistics;
      obtaining a current set of CFO estimates for each homologous pair of negative and positive tones from the set of positive tone estimation statistics and the set of negative tone estimation statistics; and
      determining a phase rotation for phase compensation from the current set of CFO estimates.

6. The system of claim 5, wherein the homologous set of outputs is an emulation of Fourier transform outputs corresponding to the previous OFDM symbol and obtained by applying a phase rotation estimate to a reference OFDM symbol, wherein the phase rotation estimate compensates for frequency offsets up to and including the previous OFDM symbol.

7. The system of claim 5, wherein $\{\rho_+(t,k)\}_{k \in P^+} = \{Y_{t,k} Y^*_{t-\gamma,k}\}_{k \in P^+}$ and $\{\rho_-(t,k)\}_{k \in P^-} = \{Y_{t,k} Y^*_{t-\gamma,k}\}_{k \in P^-}$, where $\{\rho_+(t,k)\}_{k \in P^+}$ is the set of positive tone estimation statistics before the step of refining, $\{\rho_-(t,k)\}_{k \in P^-}$ is the set of negative tone estimation statistics before the step of refining, t is an index of the current OFDM symbol, t–γ is the index of the previous OFDM symbol in the same frequency band, $P^+$ is the plurality of positive pilot tones, $P^-$ is the plurality of negative pilot tones, k indexes a tone element of the plurality of pilot tones, $Y_{t,k}$ is the kth element of the current set of Fourier transform outputs, and $Y^*_{t-\gamma,k}$ is the kth element of the homologous set of Fourier transform outputs.

8. The system of claim 7, wherein the step of obtaining the current set of CFO estimates comprises determining the ratio $$\left(\frac{\text{Im}(\bar{\rho}_-) + \text{Im}(\bar{\rho}_+)}{\text{Re}(\bar{\rho}_-) + \text{Re}(\bar{\rho}_+)}\right)$$

for each homologous pair of positive and negative tones in the plurality of pilot tones, where $\bar{\rho}_+$ is an element of the set of positive tone estimation statistics after the step of refining, and $\bar{\rho}_-$ is an element of the set of negative tone estimation statistics after the step of refining.

9. A method, implemented in a system, comprising:
   obtaining a previous OFDM symbol transmitted on a frequency band;
   obtaining a current OFDM symbol transmitted on the frequency band;
   computing a current set of outputs of a Fourier transformation of the current OFDM symbol at a plurality of pilot tones, the plurality of pilot tones comprising a plurality of positive pilot tones and a plurality of negative pilot tones;
   obtaining a homologous set of outputs of the Fourier transformation of the previous OFDM symbol at the plurality of pilot tones;
   determining an estimation statistic associated with a positive virtual tone associated with the plurality of positive pilot tones, the determination performed by combining statistics for homologous positive tone pairs from the current set and the homologous set;
   determining an estimation statistic associated with a negative virtual tone associated with the plurality of negative pilot tones, the determination performed by combining statistics for homologous negative tone pairs from the current set and the homologous set;
   obtaining a CFO estimate for the current OFDM symbol from the estimation statistic associated with the positive virtual tone and the estimation statistic associated with the negative virtual tone; and
   determining a phase rotation for phase compensation from the CFO estimate.

10. The method of claim 9, further comprising:
   scaling the estimation statistic associated with the positive virtual tone by the magnitude of the estimation statistic associated with the negative virtual tone in order to refine the estimation statistic associated with the positive virtual tone; and
   scaling the estimation statistic associated with the negative virtual tone by the magnitude of the estimation statistic associated with the positive virtual tone in order to refine the estimation statistic associated with the negative virtual tone.

11. The method of claim 10, wherein the homologous set of outputs is an emulation of Fourier transform outputs corresponding to the previous OFDM symbol and obtained by applying a phase rotation estimate to a reference OFDM symbol, wherein the phase rotation estimate compensates for frequency offsets up to and including the previous, OFDM symbol.

12. The method of claim 11, wherein $$\rho_+(t) = \sum_{k \in P^+} Y_{t,k} \breve{Y}_{0,k}^* e^{-j\hat{\Omega}_{t-\gamma,k}}$$

and $$\rho_-(t) = \sum_{k \in P^-} Y_{t,k} \breve{Y}_{0,k}^* e^{-j\hat{\Omega}_{t-\gamma,k}},$$

where $\rho_+(t)$ is the estimation statistic associated with the positive virtual tone before the step of refining, $\rho_-(t)$ is the estimation statistic associated with the negative virtual tone before the step of refining, t is an index of the current OFDM symbol, t−γ is an index of the previous OFDM symbol in the same band, $P^+$ is the plurality of positive pilot tones, $P^-$ is the plurality of negative pilot tones, k indexes a tone element in the plurality of pilot tones, $Y_{t,k}$ is an output of the Fourier transform for the kth pilot tone of the current OFDM symbol, $\breve{Y}_{0,k} = P_k \breve{H}_k$ is the kth tone in the reference OFDM symbol reconstructed from a channel estimate and a known pilot symbol, $P_k$ is the pilot signal at the kth tone, $\breve{H}_k$ is the estimated channel coefficient for the kth tone, and $\hat{\Omega}_{t-\gamma,k}$ is the phase rotation estimate at the kth tone.

13. The method of claim 12, wherein the step of obtaining the CFO estimate comprises determining the ratio $$\left( \frac{\text{Im}(\bar{\rho}_-) + \text{Im}(\bar{\rho}_+)}{\text{Re}(\bar{\rho}_-) + \text{Re}(\bar{\rho}_+)} \right)$$

where $\bar{\rho}_+$ is the estimation statistic associated with the positive virtual tone after the step of refining and $\bar{\rho}_-$ is the estimation statistic associated with the negative virtual tone after the step of refining.

14. A system for determining a frequency offset comprising:
an antenna;
a processor, coupled to the antenna; and
a memory, coupled to the processor and configured to store instructions causing the processor to perform the steps of:
obtaining a previous OFDM symbol transmitted on a frequency band
obtaining a current OFDM symbol transmitted on the frequency band;
computing a current set of outputs of a Fourier transformation of the current OFDM symbol at a plurality of pilot tones, the plurality of pilot tones comprising a plurality of positive pilot tones and a plurality of negative pilot tones;
obtaining a homologous set of outputs of the Fourier transformation of the previous OFDM symbol at the plurality of pilot tones;
determining a estimation statistic associated with a positive virtual tone corresponding to the plurality of positive pilot tones, the determination performed by combining statistics for homologous positive tone pairs from the current set and the homologous set;
determining a estimation statistic associated with a negative virtual tone corresponding to the plurality of negative pilot tones, the determination performed by combining statistics for homologous negative tone pairs from the current set and the homologous set;
obtaining a CFO estimate for the current OFDM symbol from the estimation statistic associated with the positive virtual tone and the estimation statistic associated with the negative virtual tone; and
determining a phase rotation for phase compensation from the CFO estimate.

15. The system of claim 14, wherein the steps further comprise:
scaling the estimation statistic associated with the positive virtual tone by the magnitude of the estimation statistic associated with the negative virtual tone in order to refine the estimation statistic associated with the positive virtual tone; and
scaling the estimation statistic associated with the negative virtual tone by the magnitude of the estimation statistic associated with the positive virtual tone in order to refine the estimation statistic associated with the negative virtual tone.

16. The system of claim 14, wherein the homologous set of outputs is an emulation of Fourier transform outputs corresponding to the previous OFDM symbol and obtained by applying a phase rotation estimate to a reference OFDM symbol, wherein the phase rotation estimate compensates for frequency offsets up to and including the previous OFDM symbol.

17. The system of claim 16, wherein $$\rho_+(t) = \sum_{k \in P^+} Y_{t,k} \breve{Y}_{0,k}^* e^{-j\hat{\Omega}_{t-\gamma,k}}$$

and $$\rho_-(t) = \sum_{k \in P^-} Y_{t,k} \breve{Y}_{0,k}^* e^{-j\hat{\Omega}_{t-\gamma,k}},$$

where $\rho_+(t)$ is the estimation statistic associated with the positive virtual tone before the step of refining, $\rho_-(t)$ is the estimation statistic associated with the negative virtual tone before the step of refining, t is an index of the current OFDM symbol, t−γ is an index of the previous OFDM symbol in the same band, $P^+$ is the plurality of positive pilot tones, $P^-$ is the plurality of negative pilot tones, k indexes a tone element in the plurality of pilot tones, $Y_{t,k}$ is an output of the Fourier transform for the kth pilot tone of the current OFDM symbol, $\breve{Y}_{0,k} = P_k \breve{H}_k$ is the kth tone in the reference OFDM symbol reconstructed from a channel estimate and a known pilot symbol, $P_k$ is the pilot signal at the kth tone, $\breve{H}_k$ is the estimated channel coefficient for the kth tone, and $\hat{\Omega}_{t-\gamma,k}$ is the phase rotation estimate at the kth tone.

18. The system of claim 17, wherein the step of obtaining the CFO estimate comprises determining the ratio $$\left( \frac{\text{Im}(\bar{\rho}_-) + \text{Im}(\bar{\rho}_+)}{\text{Re}(\bar{\rho}_-) + \text{Re}(\bar{\rho}_+)} \right)$$

where $\bar{\rho}_+$ is the estimation statistic associated with the positive virtual tone after the step of refining and $\bar{\rho}_-$ is the estimation statistic associated with the negative virtual tone after the step of refining.

\* \* \* \* \*